United States Patent [19]

Ahn et al.

[11] Patent Number: 5,188,923

[45] Date of Patent: Feb. 23, 1993

[54] OPTICAL STORAGE MEDIA WITH DISCONTINUOUS THIN METALLIC FILMS

[75] Inventors: Kie Y. Ahn, Chappaqua; Harold N. Lynt, Jr., Cold Spring; Victor B. Jipson, Mahopac, all of N.Y.

[73] Assignee: International Business Machines Corporation, Armonk, N.Y.

[21] Appl. No.: 492,187

[22] Filed: Mar. 12, 1990

Related U.S. Application Data

[63] Continuation of Ser. No. 430,053, Oct. 30, 1989, abandoned, which is a continuation of Ser. No. 796,482, Nov. 6, 1985, abandoned, which is a continuation of Ser. No. 507,314, Jun. 23, 1983, abandoned, which is a continuation-in-part of Ser. No. 336,525, Dec. 31, 1981, abandoned.

[51] Int. Cl.$^5$ ................................................ G03B 1/72
[52] U.S. Cl. ..................................... 430/273; 430/270; 430/290; 430/296; 430/495; 430/496; 430/945; 430/964; 346/135.1
[58] Field of Search ......................... 346/76 L, 135.1; 369/279, 284; 430/290, 296, 945, 270, 964, 495, 496, 273; 428/64, 65

[56] References Cited

U.S. PATENT DOCUMENTS

| | | | |
|---|---|---|---|
| 3,314,073 | 4/1967 | Becker | 346/76 L |
| 3,665,483 | 5/1972 | Becker et al. | 346/1 |
| 3,990,084 | 11/1976 | Hamisch et al. | 430/945 |
| 4,008,084 | 2/1977 | Ikeda et al. | 430/299 |
| 4,069,487 | 1/1978 | Kasai et al. | 346/76 L |
| 4,082,549 | 4/1978 | Haas et al. | 96/1 R |
| 4,252,677 | 2/1981 | Smith | 430/945 |
| 4,252,890 | 2/1981 | Haas et al. | 346/76 L |
| 4,328,303 | 5/1982 | Ronn et al. | 430/290 |
| 4,335,198 | 1/1982 | Hanada et al. | 430/348 |
| 4,451,915 | 5/1984 | Labudd et al. | 381/109 |

FOREIGN PATENT DOCUMENTS

| | | |
|---|---|---|
| 0079231 | 5/1983 | European Pat. Off. |
| 58-77042 | 5/1983 | Japan |
| 2061595 | 5/1981 | United Kingdom |

OTHER PUBLICATIONS

Drexler, J. Vac. Sci. Technol. vol. 18, No. 1 pp. 87–91 (Jan./Feb. 1981).
Doremos, J. of Applied Physis, vol. 37, No. 7 Jun. 1966 pp. 2775–2780.
Harris et al, Image Technology vol. 12, No. 3, Apr.-/May 1970 pp. 31–34.
CRC Handbook of Chemistry and Physics, 59th Edition, "Table of Melting and Boiling Points and Atomic Weights of the Elements" 1978, Robert E. Weast.
International Plastics Handbook, Saechtling, pp. 220–221.
Kunststoff, Handbuch Band VIII Polyster, 1973, pp. 714–717.

Primary Examiner—Richard L. Schilling
Attorney, Agent, or Firm—Bernard E. Shay; David Aker

[57] ABSTRACT

An optical storage medium for storing binary data adapted to be written upon by a laser forming an array of encoded spots is composed of a substrate possibly covered with a mirror layer and including a matrix of a transparent dielectric material such as a polymer upon which a vacuum deposited discontinuous film of nucleated metallic islands is deposited having thicknesses of less than about 100 Å. The particles extend up to 1000 Å transversely generally parallel to the surface of said substrate. The islands are separated by a short distance for facilitating coalescence of particles together to effect writing of spots at low energy by the lateral motion and gathering of the islands during heating of the islands by a laser beam or the like. Each spot represents a data bit in a binary position code. The matrix material has low thermal conductivity and preferably a low melting point to facilitate writing at low energy.

17 Claims, 17 Drawing Sheets

FIG. 7.1
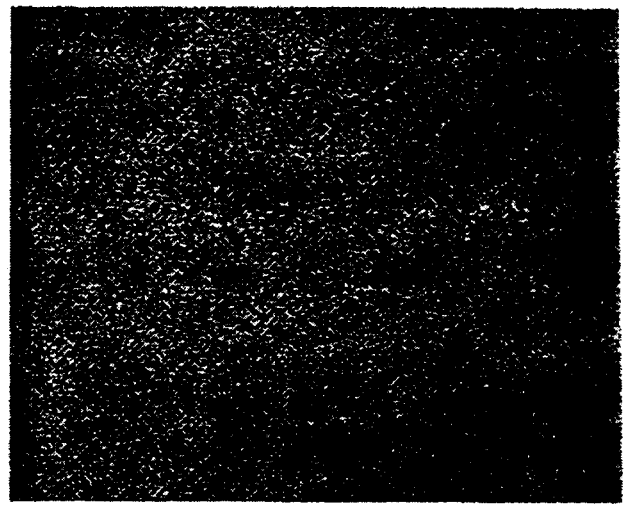
A−10Å
|←→|
1000Å
FIG. 7.2
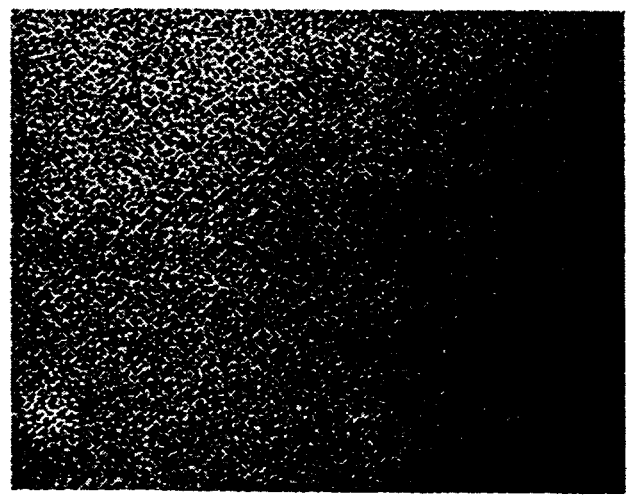
B−20Å

FIG. 7.3
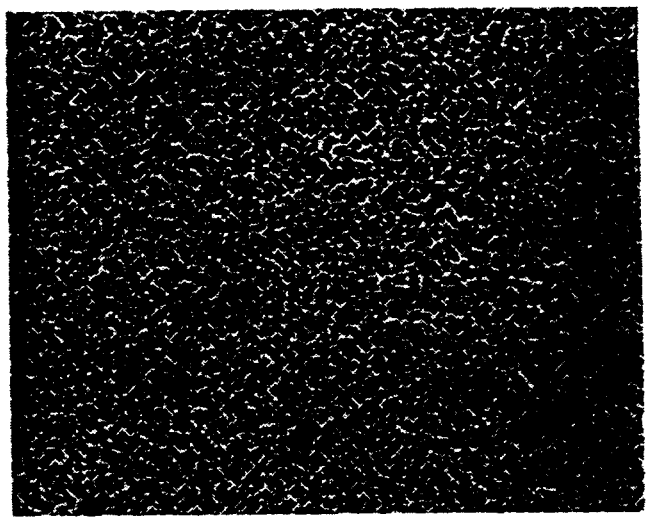
C = 30 Å
|← 1000Å →|
FIG. 7.4
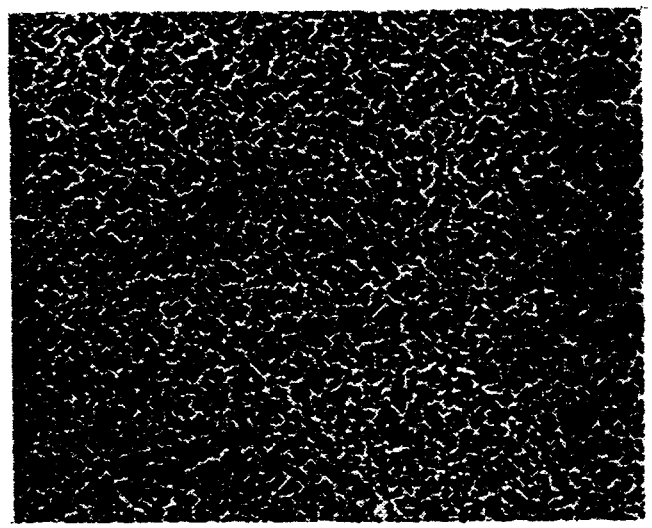
D = 40 Å

FIG. 8.1
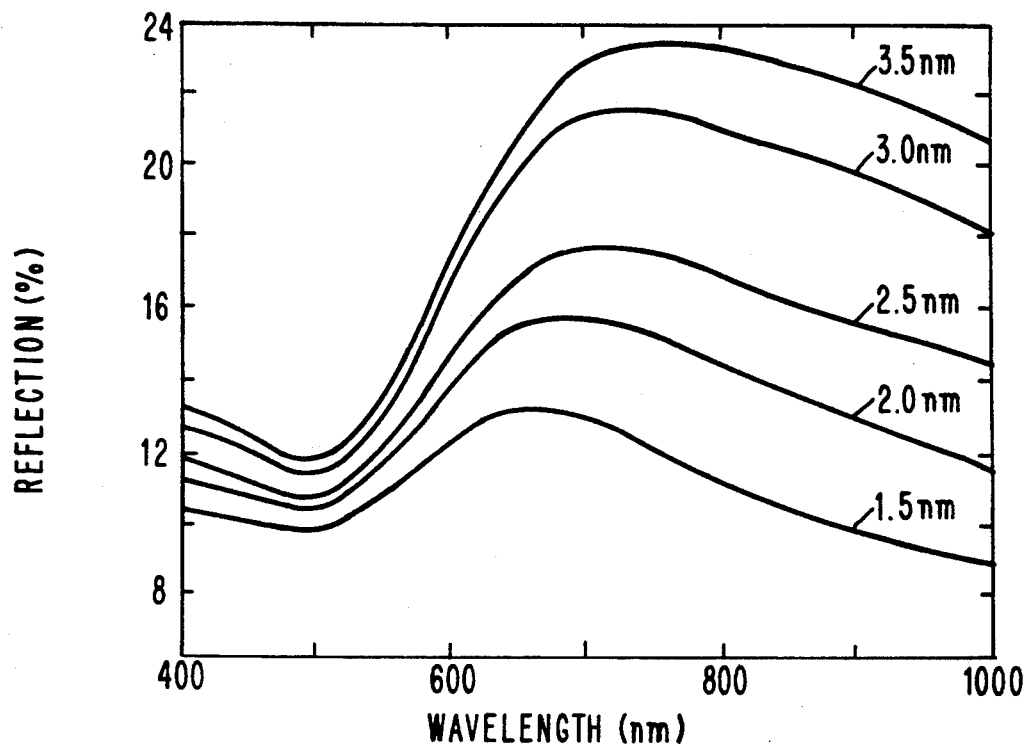
FIG. 8.2
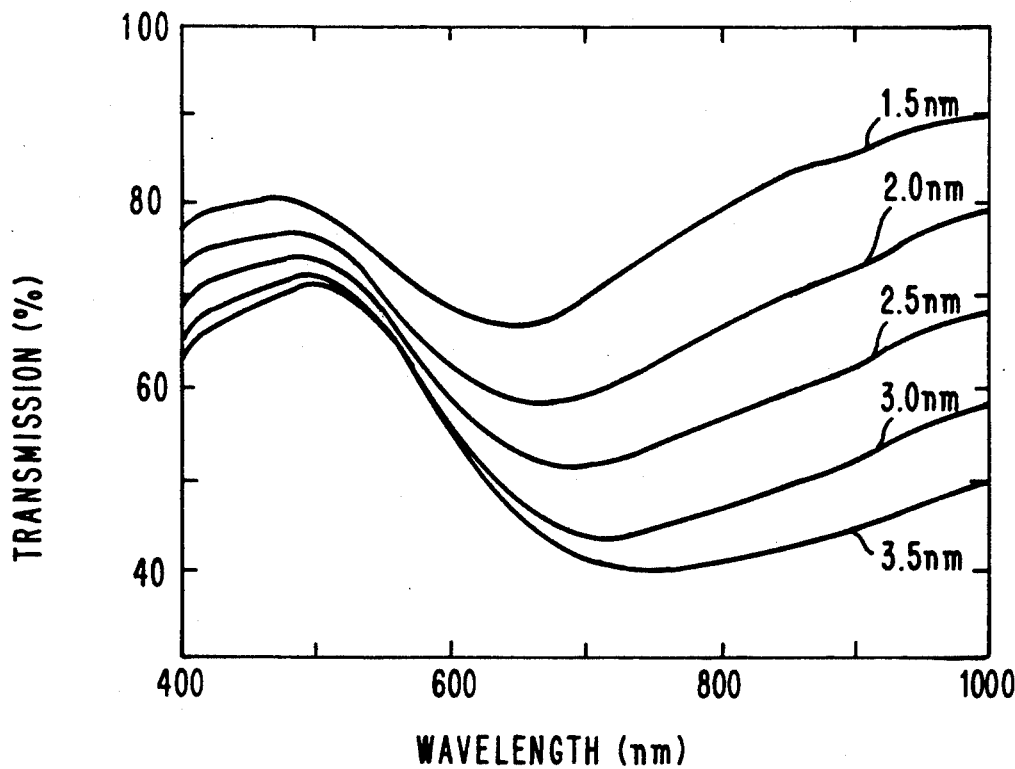

FIG. 17.1
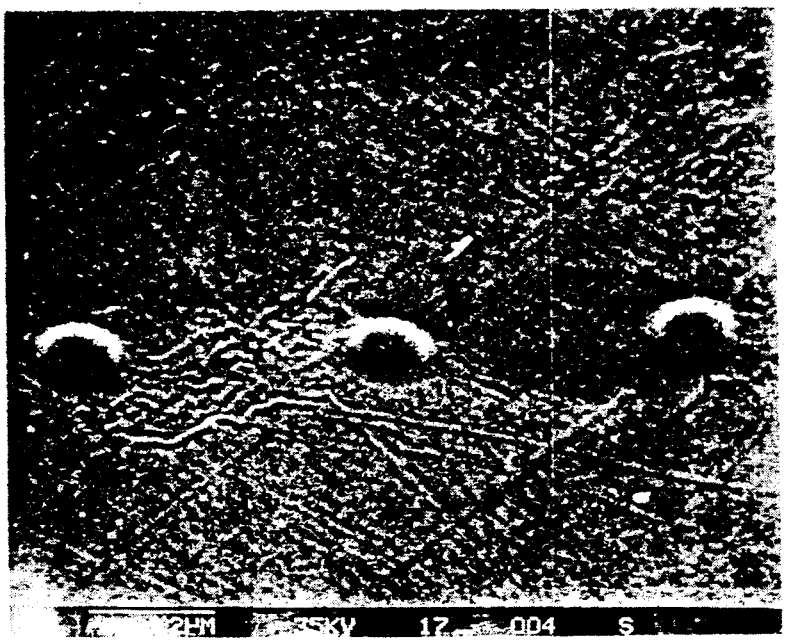
FIG. 17.2
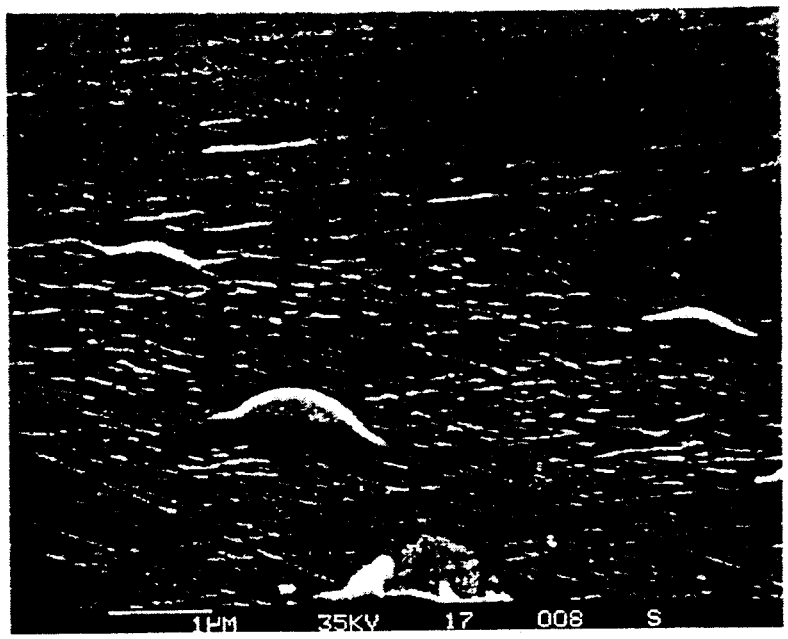

FIG. 19.1
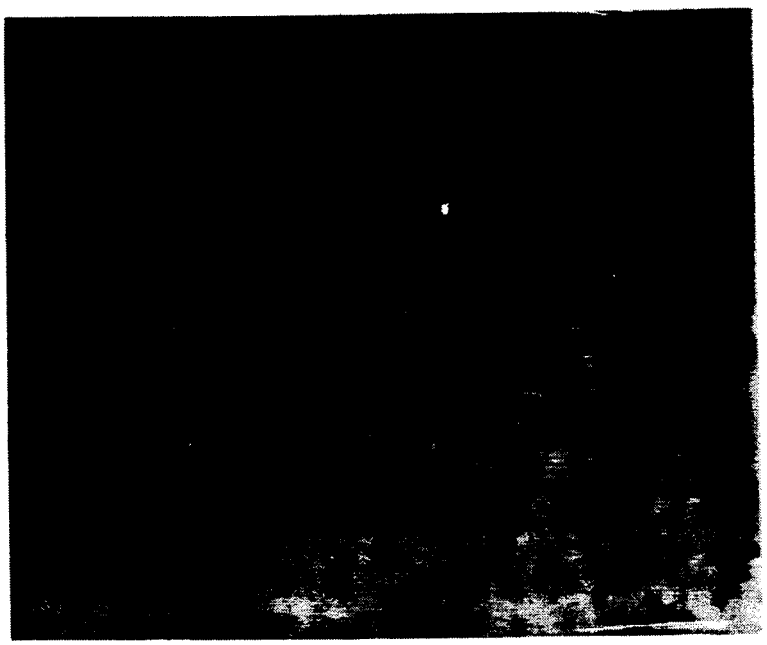
FIG. 19.2
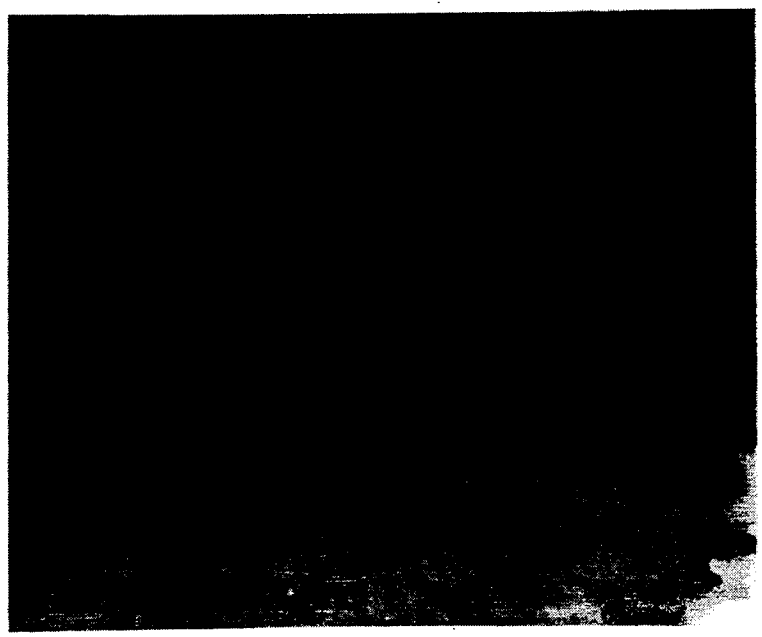

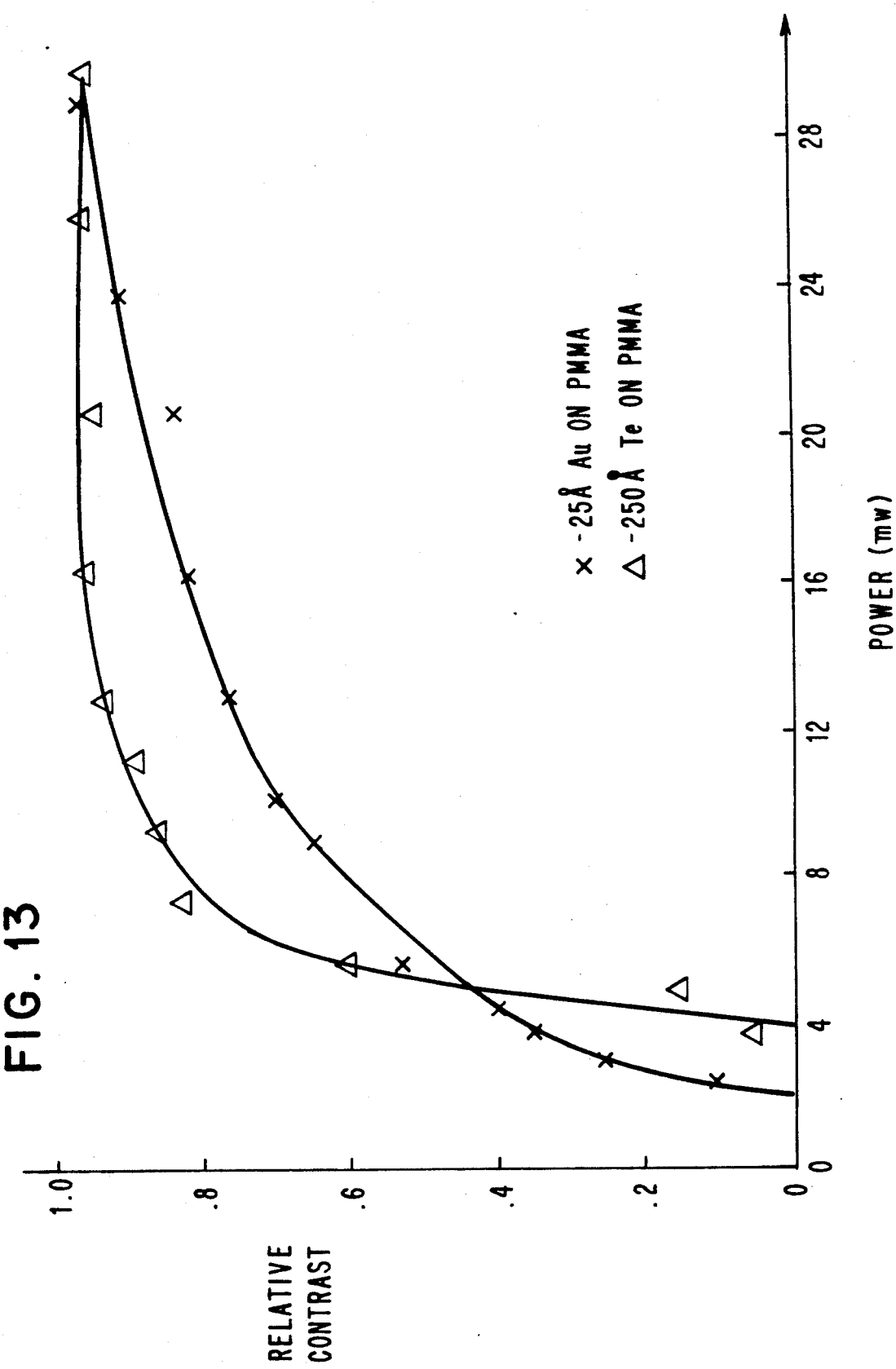

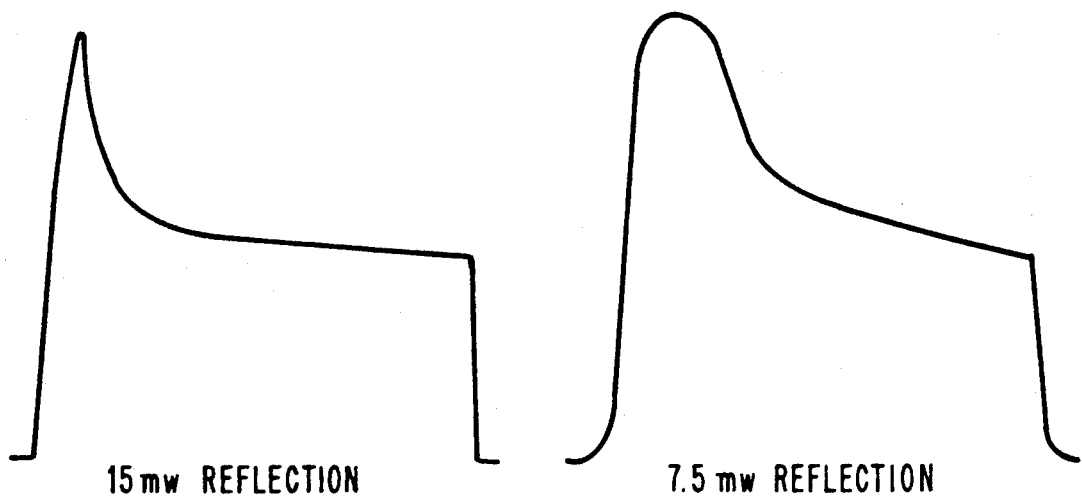
FIG. 15.1  15 mw REFLECTION
FIG. 15.3  7.5 mw REFLECTION
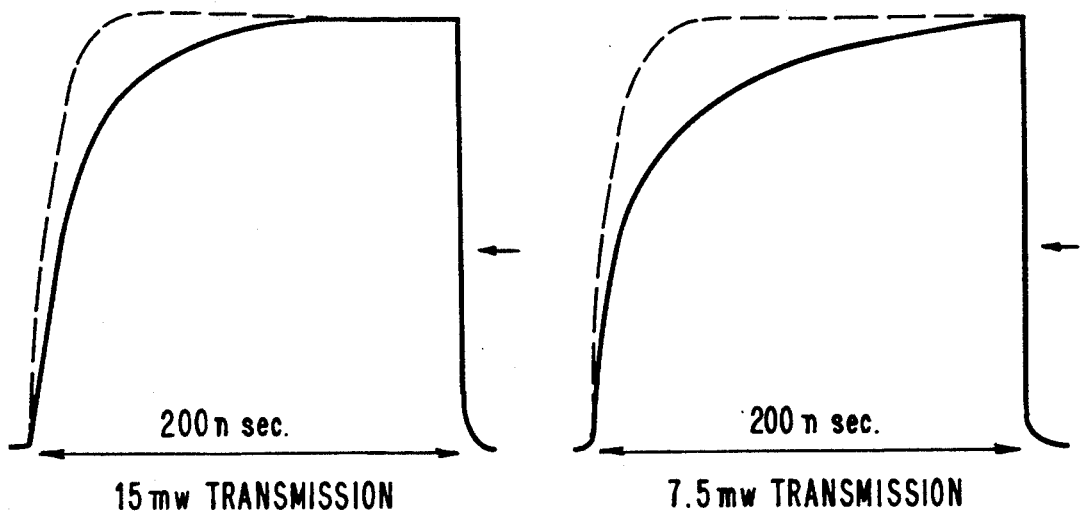
FIG. 15.2  15 mw TRANSMISSION
FIG. 15.4  7.5 mw TRANSMISSION

OPTICAL STORAGE MEDIA WITH DISCONTINUOUS THIN METALLIC FILMS

This is a continuation application Ser. No. 07/430,053, filed Oct. 30, 1989 now abandoned. which is a continuation application Ser. No. 06/796,482, filed Nov. 6, 1985, now abandoned, which is a continuation of application Ser. No. 06/507,314, filed Jun. 23, 1983, now abandoned, which is a continuation-in-part of copending U.S. application Ser. No. 06/336,525 filed Dec. 31, 1981, now abandoned.

BACKGROUND OF THE INVENTION

1. Field of the Invention

This invention relates to optical storage of information in the form of binary data on a coated medium. More particularly, this invention relates to media adapted to storage of encoded data in the form of an array of spots on an optically reflective medium. The spots are formed by application of a laser beam focussed upon an extremely small point on the medium as the data is being recorded.

2. Description of the Prior Art

Interest in the development of optical data storage systems has been stimulated recently by the introduction of optical video disk systems and the continued improvement in potentially inexpensive GaAlAs laser diodes. One of the major obstacles to the introduction of these systems is the development of suitable optical storage materials. A candidate material should exhibit; 1) low writing energy (compatibility with GaAlAs lasers), 2) long lifetime and 3) low cost. Several material systems have been investigated including (A) Thin Metal Films, D. Mayden, Bell Systems Technical Journal 50, 1761 (1971); and P. Kivits, P. Zalm and R. DeBont, OSA/IEEE Conference on Laser and Electrooptic Systems, San Diego, Calif. (February 1980) (unpublished); (B) Organic Dyes, V. Norotny and L. Alexandra, Journal of Appl. Polymer Science, 24, 1321–1323 (1979); V. B. Jipson and C. R. Jones, SPIE Proceedings, Infrared Dyes for Optical Storage, J. Vac. Sci. Technol., 18 No. 1 105–109 (Jan./Feb. 1981); (C) Dye Loaded Polymers, D. G. Howe and J. J. Wrobel, Solvent-Coated Organic Materials for High Density Optical Recording, J. Vac. Sci. Technol. 18 No. 1 92–99 (Jan./Feb. 1981); (D) Metal Loaded Polymers, J. Drexler, "Drexon Optical Memory Media for Laser Recording and Archival Data Storage" J. Vac. Sci. Technol. 18 No. 1 87–91 (Jan./Feb. 1981), T. W. Smith and A. T. Ward, Materials Research Society Meeting, Boston, Mass., (November 1980) (unpublished); and (E) bilayers, R. C. Miller, R. H. Willens, H. A. Watson, L. A. D'Asaro and M. Feldman, The Bell System Technical Journal, 58, 9, (1979).

U.S. Pat. No. 4,252,890 of Haas et al for "Imaging Systems Which Agglomerates Particle Material" describes in connection with FIG. 6 a method of forming an optical image by using a substrate of polyethylene terephthalate coated with a microscopically discontinuous layer of an amorphous selenium imaging material 0.2 micrometer thick to produce an image by agglomeration or fusing, of the selenium layer into particles in response to illumination of the medium with a source of energy greater than 0.2 joule/cm$^2$ through a mask. The result was a faithful image of the mask. At an energy level above 0.3 joule/cm$^2$ the selenium was evaporated in the areas illuminated through the mask. Useful coating materials are selenium, arsenic, silver, cadmium, zinc, tellurium, and radiation absorbing pigments and dyes.

U.S. Pat. No. 4,188,214 of Kido et al entitled "Recording Material" describes a laser recording material involving use of a recording medium of two materials, one of which is metal and the other of which is a compound such as a metal sulfide other than GeS, a metal fluoride or metal oxide. In the Kido patent it is suggested that the metal layer be a single layer formed of a mixture of the metals such as Au, Pt, Rh, Ag, Al, Ti, Cr, W, Cu and Te as well as many others cited in Col. 2 of the Kido patent, which are less relevant to the instant invention. No suggestion of the concept of using a polymeric or organic matrix to support the metal particles was suggested. FIG. 3 shows particles of metal supported in a matrix of the compound. The compounds are employed because of their energy absorbing characteristics to pass heat into the metal particles to increase the sensitivity of the recording material. Also, the compounds have a higher melting point than the metal materials which are more reflective. The compounds are also more stable chemically and not hygroscopic. The method of operation of the recorder is to deform or evaporate the medium.

U.S. Pat. No. 4,069,487 describes coating of an optical storage layer with an organic or inorganic layer for protection. In FIG. 6 of that patent, the optical storage layer is a laminate of a non-metallic layer and a metallic layer which combine to form a recording layer.

SUMMARY OF THE INVENTION

In accordance with this invention an optical storage medium for storing binary data by printing coding spots in the storage medium is provided. The medium is adapted to be written upon by a focussed high intensity energy beam. The medium comprises a substrate including a matrix material having a low melting point. The improvement comprises the medium including particles of small size composed of islands of an energy absorbing material dispersed in an interior or exterior thin film layer (of a planar or non-planar configuration) of such particles juxtaposed with each other with small spacings whereby focussed energy can be directed to heat individual ones of the particles to cause a change of the reflectivity of the medium to record information at the sites where heating has occurred.

Preferably the film is a noble metal selected from the group consisting of gold, silver, copper, platinum, palladium, and rhodium.

The Drexler reference describes a recording medium commercially available which includes metal particles carried in a polymer matrix on a flexible disk with the particles dispersed in a film similar to an exposed photographic emulsion.

Drexler uses dispersed particles of metal rather than a single discontinuous thin film of metal. Further, the particles are dispersed randomly, whereas in accordance with the instant invention, there are islands of metal in a single discontinuous layer. Furthermore, the amount of metal included in the medium is far greater in quantity of the Drexler media since it is dispersed throughout the thickness of the medium. Such a configuration tends to promote eruption of the particles from the medium causing ablation or vaporization of the medium. In contrast, the thin films of nucleated metal used in accordance with this invention are deposited by vacuum deposition techniques such as evaporation, sputtering, or electron beam thermal deposition techniques. These thin films coalesce rather than erupting.

In this invention the thermoplastic melts when the energy absorbing (metal) material is heated by the laser beam. Furthermore, the thin film of the metal layered with the plastic is clearly different from a dispersion of the metal in the plastic. In this invention, the individual particles are rapidly heated by the incident laser radiation inducing localized particle coalescence which results in sufficient optical contrast for data storage. The contrast mechanism of U.S. Pat. No. 4,252,890 of Haas differs substantially in scale (thicknesses of about 0.001 to about 0.01 $\mu$m in accordance with this invention as compared to 0.01 to 2 $\mu$m in Haas). Applicants also teach the use of noble metals such as gold in view of their improved stability whereas U.S. Pat. No. 4,252,890 describes use of much less stable materials and is addressing the application of forming photographic types of images as contrasted with recording data on an encoded data storage medium.

In accordance with this invention, in an optical storage medium for storing binary data by printing coding spots in a uniform medium adapted to be written upon by a focussed high intensity energy beam, the medium comprises a substrate including a matrix material having a low melting point. The improvement comprises the medium including particles of small size composed of islands of an energy absorbing material dispersed in a thin interior or exterior thin film layer of the particles juxtaposed with each other with small spacings whereby focussed energy can be directed to heat individual ones of the particles to cause a change in the reflectivity of the medium to record information at the sites where heating has occurred. Preferably the thin film layer is composed of a metal selected from the group consisting of gold, silver, copper, platinum, palladium and rhodium. Preferably, the thin film layer is selected from the group of noble metals of gold, platinum, palladium and rhodium, and the thin film layer is composed of particles ranging in thickness from about 0.001 to 0.01 micrometers and the particles range from about 0.0025 to 0.1 micrometers wide. Preferably, a radiation reflecting layer is juxtaposed with the thin film layer separated by an intermediate layer having a thickness equal to ¼ wavelength of the radiation to be applied to the medium.

In general, then it is preferred that the energy absorbing material of this invention comprises particles of gold ranging in thickness from about 0.001 to about 0.01 micrometers and in width from about 0.0025 to about 0.1 micrometers. A dust cover can be provided to protect the energy absorbing material. Preferably, a reflective layer is juxtaposed with a thin film layer separated therefrom by an optically transparent layer. The energy absorbing material comprises particles of gold on the order of about 0.003 micrometers thick and about 0.005 to 0.01 micrometers in diameter. Preferably, the medium is applied with a density such that less than 4 mg of gold is required for an area equivalent to a twelve inch diameter optical disk. The energy absorbing medium is transformed by laser writing to form marks characterized by particle sizes of about 0.02 to 0.04 micrometers in size. The particles are preferably prepared by means of vacuum deposition by a method including thermal evaporation, sputtering and ion-beam deposition and the substrate comprises a material selected from polymethyl methacrylate (PMMA), glass, polycarbonate and aluminum.

BRIEF DESCRIPTION OF THE DRAWINGS

FIGS. 7.1 to 7.4 are TEM images of Au particles deposited in a discontinuous form in accordance with this invention. The thicknesses of the films vary from 10 Å for FIG. 7.1 to 40 Å for FIG. 7.4.

FIG. 8.1 is a graph of reflectivity (in percentage of refection) vs. wavelength for five different film thicknesses.

FIG. 8.2 is a graph of the percentage of transmission of light vs. wavelength for the same samples as FIG. 8.1.

FIG. 13 is a graph of relative contrast vs. power of the laser beam for comparison of a film of gold with a film of tellurium.

FIGS. 15.1 to 15.4 are graphs of optical energy levels as a function of time for reflection and transmission of the energy for two writing pulses with different levels of power.

DESCRIPTION OF THE PREFERRED EMBODIMENT

An ideal optical storage medium would have optical absorption properties like those of metals and thermal properties like those of polymers in that they possess low thermal conductivity. An effort to achieve that objective is manifested in the designs of FIGS. 1-6.

Figure 1:
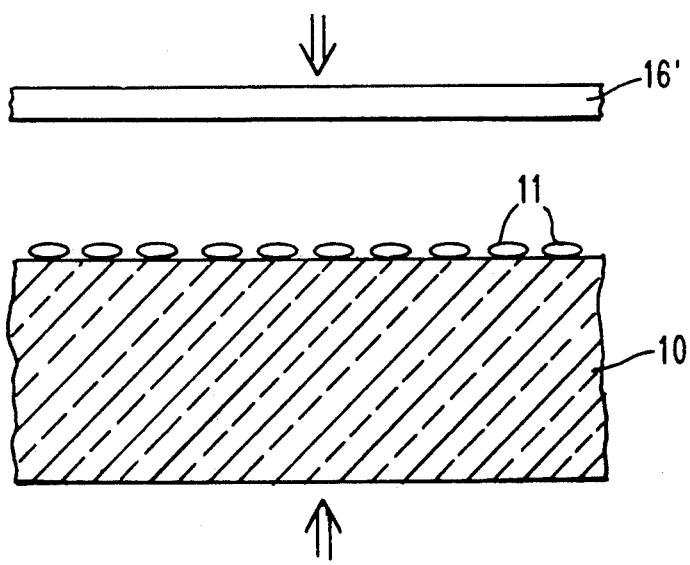
FIG. 1 is a schematic drawing of an enlarged section of a storage medium in accordance with this invention.

In FIG. 1 a substrate 10 is coated with a thin discontinuous film of islands of reflective metallic particles 11. Islands 11 are about 25 to 1000 Angstroms wide and 10 to 100 Angstroms thick (0.001–0.01 $\mu$m thick and 0.0025 to 0.1 $\mu$m wide).

Alternative metals can be used for film 11, but they must be reflective. Gold is the preferred material and because of the extremely small amount of gold employed, the cost is low. Alternative metals are silver, copper, platinum, palladium and rhodium. All of the metals are noble metals or extremely stable. The particle sizes are on the low side for Pt, Pd and Rh, yet they offer excellent stability and larger sizes of particles of Cu, and Ag permit their use as an economical substitute for gold.

When recording is performed a high intensity energy beam such as a laser is directed upon the metallic particles which absorb the energy and become heated. The localized heating forms a coalesced spot in which the metallic particles join together or agglomerate greatly reducing the space through which particles are dispersed. We have discovered that the reflectivity afforded by the film of particles is reduced very significantly. The temperature of the particles is controlled by the properties of the substrate 10. The thermal conductivity of the active media is dominated by the substrate 10 since the metallic film 11 is discontinuous and the optical absorption properties are attributable to the properties of the metallic film 11.

The substrate 10 should be composed of a material which is compatible with the support of layer 11 and if the light for writing data on the storage medium is to be applied from below the substrate through it to heat the layer 11, then the substrate material must be transparent. A transparent substrate 10 could be composed of PMMA, glass, fused quartz and other suitable materials. The thickness of the substrate could be on the order of 1 mm (1000 $\mu$m). Preferably, the substrate is glass or a plastic such as PMMA. In addition, if light is exposed to the upper surface of the medium shining down on layer 11, then there should be a dust cover 16 which keeps dust from collecting on the surface of layer 11. In this case, the substrate could be of any material of suitable flatness and surface quality and need not be optically clear.

Figure 2:
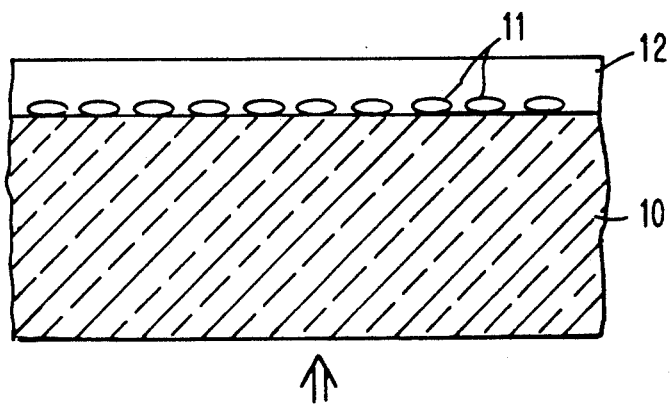
FIGS. 2 to 6 are modificiations of the storage medium of FIG. 1 and are all in accordance with this invention.

In the case of FIG. 2, the structure of FIG. 1 has been modified by the addition of a layer 12 of a plastic material such as PMMA which preferably is clear optically and non-birefringent. Preferably, in this case light is applied to the metal layer 11 from the back side of the substrate as indicated by the arrow.

Figure 3:
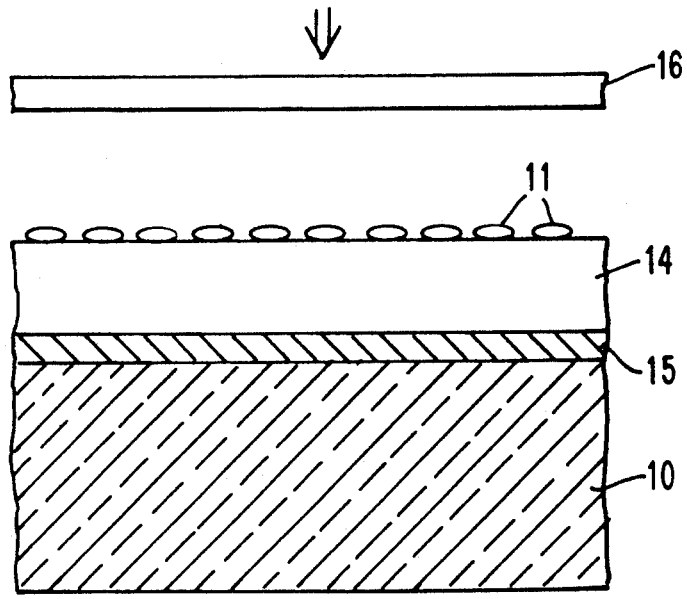

FIG. 3 shows another modification of the structure of FIG. 1 wherein there is a reflective layer 15 composed of a mirror like material such as Al, Ti, Cr, (or Au, Pt, Rh which are expensive for that purpose). The layer 15 is preferably about 500 to 1000 Angstroms thick. Between the layer 11 and layer 15 is a layer 14 of a polymer or plastic material which is optically transparent and about ¼ wavelength at the frequency of the laser used to write on the medium. For example, the layer 14 could be on the order of 1000-1400 Angstroms thick (0.1-0.14 $\mu$m thick). Preferably, a dust cover 16 is provided so that light can be applied to the medium from the top without degradation of the image caused by dust particles since they are held away from the surface of the recording layer 11.

Figure 4:
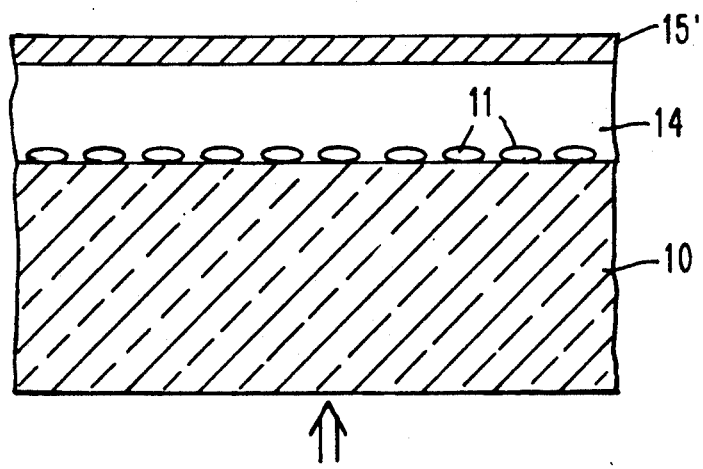

FIG. 4 shows a modification of the FIG. 1 and 3 structures to provide a reflection layer 15' on top of the spacer layer 14 with the reflective layer 11 of islands on a transparent substrate 10 which is adapted to have light shone through the back surface as illustrated by the arrow.

Figure 5:
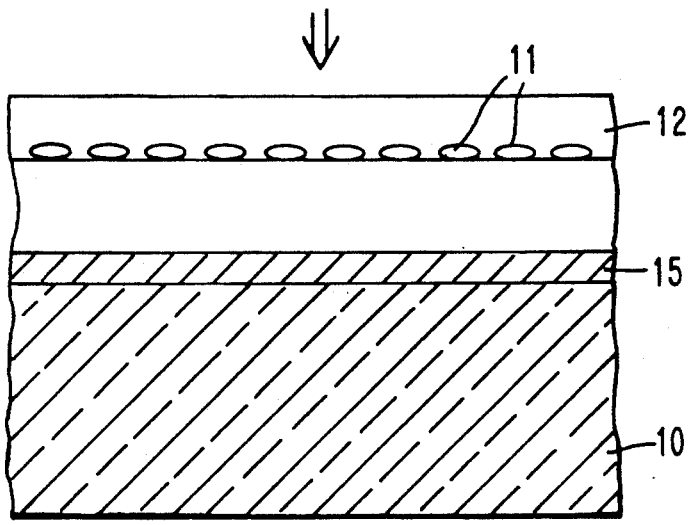

FIG. 5 is the same as FIG. 3 with the exception that a dust protection layer 12 has been deposited upon the layer 11 as in FIG. 2.

Figure 6:
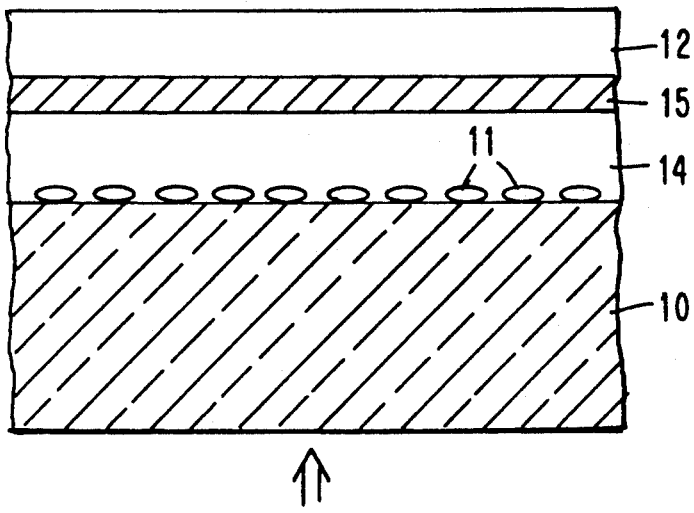

FIG. 6 is the same as FIG. 4 with the exception that layer 12 has been applied on the top as in FIGS. 2 and 5.

The media of FIGS. 1 to 6 is exposed preferably by means of a laser such as a gallium arsenide laser with a wavelength from 780-880 nm. Alternative lasers are HeNe-632.8 nm, Kr-647.1 nm, Ar-488 nm and HeCd. The intensity is about 0.5 n joule/micrometer squared. The duration of the laser beam applied to the media is 10 nanoseconds up to about 1 microsecond. The power of the beam is from 20 milliwatts down to about 1 milliwatt.

Tellurium is not a particularly good choice for the metal in these structures due to its poor lifetime qualities and low melting point. A better choice from a lifetime standpoint would be noble metals such as gold, platinum, rhodium or high stability alloys with suitable film nucleation properties. In FIGS. 7.1-7.4 we show the film nucleation properties of gold. It can be seen that this is a suitable material for this application. FIG. 7.1 shows a deposit of 10 Å of Au on a carbon substrate with a scale of 1 cm representing about 1000 Å. FIG. 7.2 shows the pattern for 20 Å of Au on a carbon substrate. FIG. 7.3 shows the pattern for 30 Å of Au on a carbon substrate. FIG. 7.4 shows the pattern for 40 Å of Au on a carbon substrate. Magnification is about 98000 times for each image. Our measurements and calculations indicate that about 30 Angstroms (0.003 $\mu$m) of gold in a single polymer sandwich would result in an optimized optical structure exhibiting reflectivity changes of greater than 50% between the written and unwritten case. This represents a cost of less than 25¢/12" disk for the gold. Many other metals are also appropriate for this process if their film nucleation properties are suitable. For instance, Ag, Al, Ti, Cr, W, Cu, etc., all provide lower cost than the noble metals. Of these Ag is known to form small nucleation islands. Al is of particular interest due to low cost and potentially high stability after surface oxide formation (this oxide is self limiting).

An extremely wide range of polymers exist which would be applicable to these structures. They would be selected for long lifetime, low thermal conductivity and low writing temperature. For fabrication ease polymers that can be glow discharge deposited are of special interest.

Fabrication of samples to date has included the solution casting of the thin polymer layers and thermal evaporation of the metal. This involves several steps. A more practical approach would be to use glow discharge techniques for the polymer deposition followed by thermal evaporation of the metal layer. In this way a multi-layered structure could be fabricated in a single vacuum chamber.

In summary:
1) Discontinuous metal films can be fabricated through the use of thin film nucleation mechanisms.
2) These structures have been successfully demonstrated. In particular we show that the thermal conductivity effects of the metal can be greatly reduced by using a discontinuous film. This will allow the use of more stable materials than tellurium as previously discussed.
3) A fabrication technique including the glow discharge deposition of the polymer with thermal evaporation of metals in a single chamber is proposed. This would allow the entire optical structure to be fabricated in one system with potentially high yield.
4) That since the metal loaded polymers are formed by a highly repeatable film nucleation process, they will be much more uniform than those obtained through solution casting techniques.

Here we consider the use of discontinuous metal films as the active layer in an ablative optical structure. We demonstrate that systems can be configured utilizing potentially stable noble metals as the active material while providing writing energies that are superior to tellurium based systems. The obvious goal of this work is to provide sensitivity without compromising lifetime.

The nucleation of thin films has been studied by several authors [K. L. Chopra, *Thin Film Phenomena*, McGraw Hill Book Company, (1969); D. W. Pashley, M. J. Stowell, M. H. Jacobs and T. J. Law, Phil. Mag., 10:127, (1964)]. In particular the island formation of gold films below some critical thickness is well known. In FIGS. 8.1 and 8.2 respectively, the measured reflectivity and transmissiviity of gold films on PMMA substrates are shown as a function of wavelength. For the deposition conditions employed here (1 Å/sec deposition onto 25° C. PMMA substrates at $5 \times 10^{-7}$ torr), films 3.0 nm thick or less form a discontinuous island structure with individual islands 5.0-10.0 nm in diameter. For thicknesses above 3.0 nm, rapid networking of the islands is observed. The optical absorption of discontinuous films (100%-R%-T% neglecting scattering effects) can be as high as 30%. This strong optical absorption coupled with a relatively high optical reflectivity make these films candidates for optical storage applications. This is particularly true when a trilayer structure is employed, [A. E. Bell and F. W. Spong, IEEE Journal of Quantum Electronics, 14, 497 (1973)]. This anti-reflection geometry dramatically increases the light absorption in the gold while providing high readback contrast.

Figure 9:
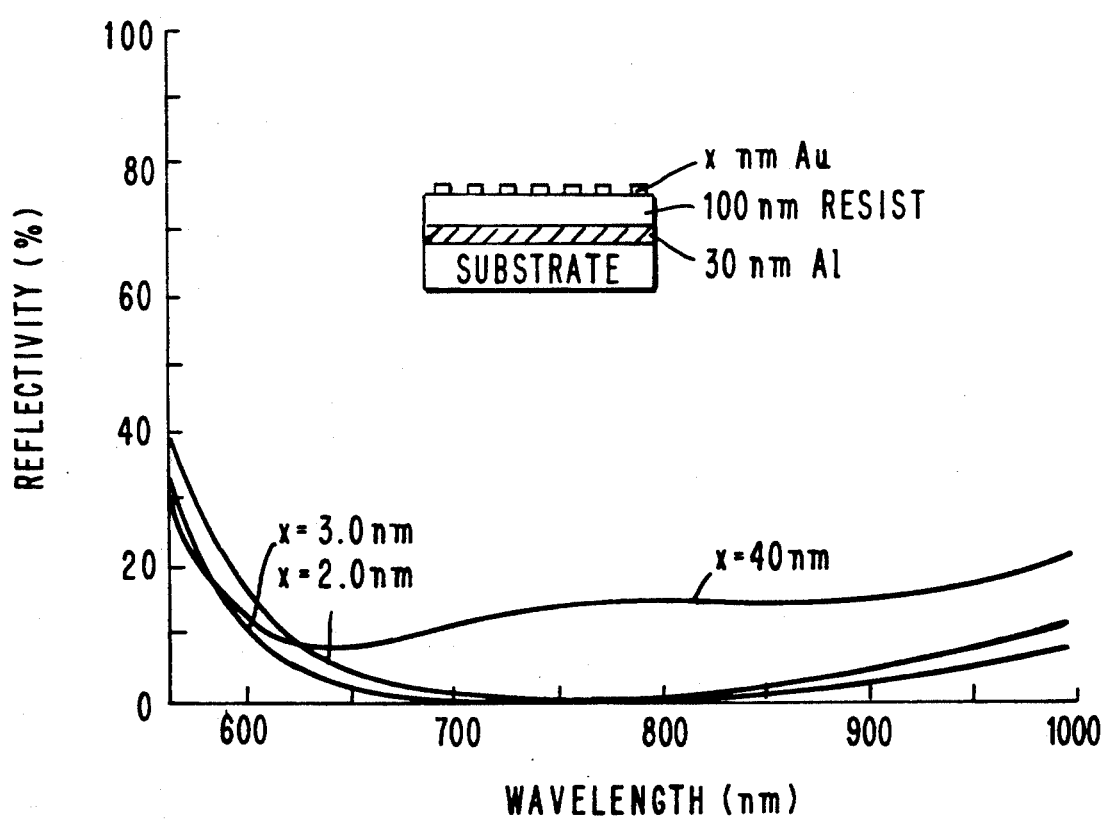
FIG. 9 is a graph of reflectivity vs. wavelength for a trilayer structure in accordance with one aspect of this invention.

FIG. 9 shows the measured optical reflectivity from gold trilayers for varying gold thicknesses of 2.0, 3.0 and 4.0 nm. The trilayer structure utilized is shown in the inset. The resist used is Shipley AZ1350J. For the 2.0 and 3.0 nm films less than 10% of the incident radiation is reflected at wavelengths from 650-900 nm. The 4.0 nm film (an electrically conducting film indicating at least partial continuity) exhibits greater reflectivity at wavelengths above 650 nm, but excellent optical coupling still exists.

The ability to couple optical energy efficiently into the ultra-thin gold layer is certainly desirable, but it does not insure that the film can be ablated at low energies. Trilayers with a continuous 7.5 nm thick titanium active layer were found to require four times more energy than an equivalent structure using tellurium, [Bell et al supra and A. E. Bell and R. A. Bartolini, APL, 34, 275 (1979)]. There are two principle reasons for this increase. The melting point of titanium is more than 1000° C. higher than for tellurium while its thermal conductivity is nearly an order of magnitude greater.

Thus titanium must be heated to a much higher temperature in order for writing to occur, while at the same time losing more energy due to thermal diffusivity effects. Based o this comparison one would not expect gold trilayers to exhibit low writing energies. The melting point of gold while less than that of titanium is still 600° C. greater than that of tellurium. Furthermore, the bulk thermal conductivity of gold is nearly two orders of magnitude greater than that of tellurium. This is somewhat offset by the discontinuous nature of the gold film which limits lateral thermal diffusivity, but typically it is thermal losses from the film to the substrate that are most significant. M. Chen, V. Marrello and W.-Y. Lee, Materials Research Society Meeting, Boston, Mass., November 1980 (unpublished).

Figure 10:
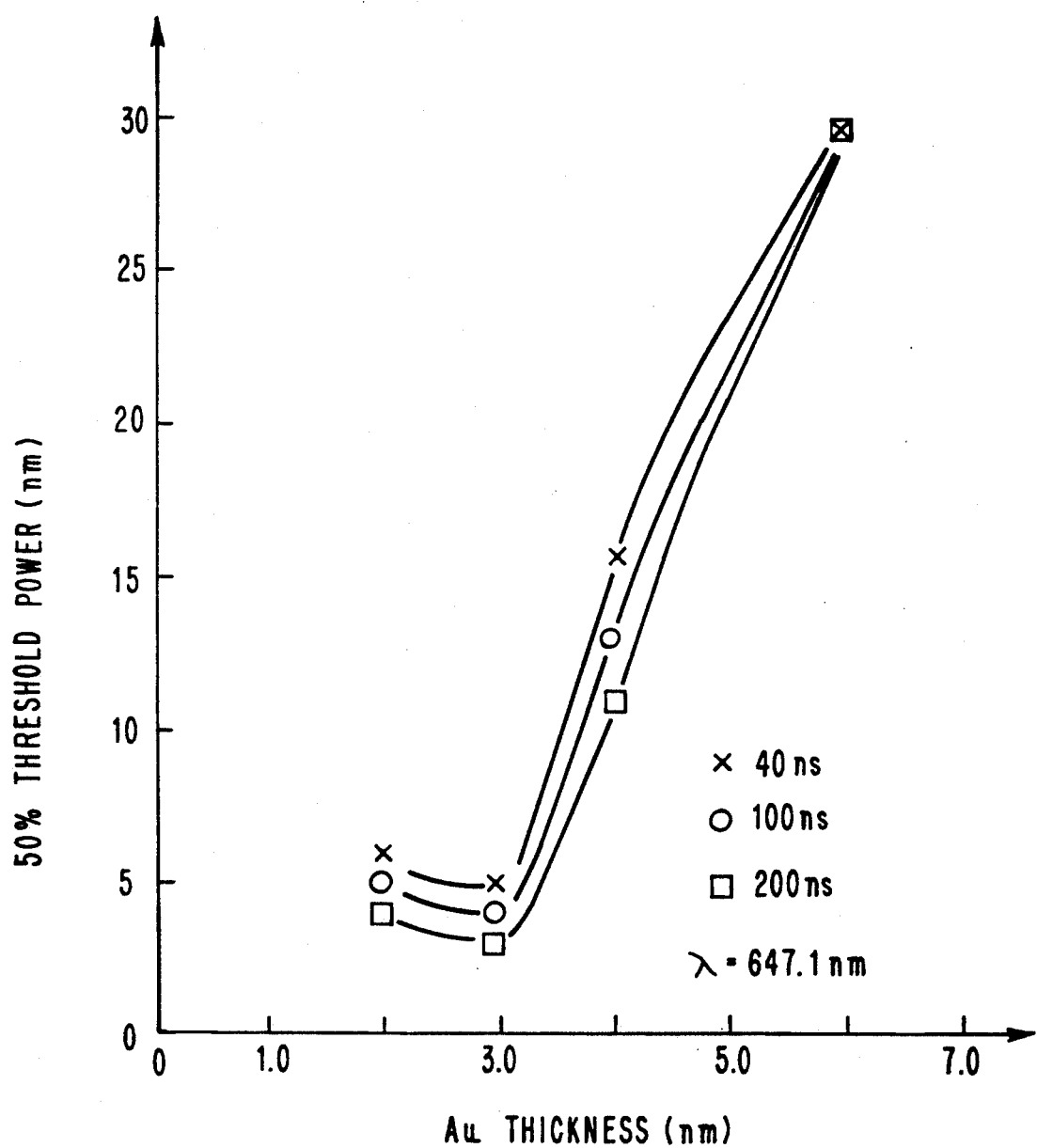
FIG. 10 is a graph of fifty percent of threshold power vs. thickness of a gold film deposited upon the substrate in accordance with one aspect of this invention.

The optical writing characteristics of these films were studied using a microcomputer controlled static laser writer that incorporates a krypton laser ($\lambda = 647.1$ nm) with a 0.6 N.A. focussing objective. In these tests, the optical reflectivity change at the surface was monitored as a function of writing power and pulse width. For comparison of the writing energy with other materials, we use the point at which the optical change induced in the material is 50% of the maximum change that is attainable through increased writing energy. The values of writing power vs. gold thickness for several gold trilayers as a function of gold thickness are shown in FIG. 10. Pulse width is a parameter. The structure compared is that shown in FIG. 9. From this it is evident that films above 3.0 nm thick require significantly more writing energy. This corresponds to the point at which the discontinuous gold islands start to network into a continuous film. This rapid increase in writing energy cannot be explained by the gradual increase in optical reflectivity with thickness. Obviously the discontinuous nature of the film plays a major role in determining the writing energy. Furthermore, it should be noted that the writing energy of these structures is quite non-reciprocal with pulse duration indicating that shorter pulse durations will result in a reduction in writing energy. The minimum 50% contrast writing energy is seen to be 0.2 nJ (5 mw @40 nsec.) for trilayers using photoresist layer as the dielectric spacer.

Figure 11:
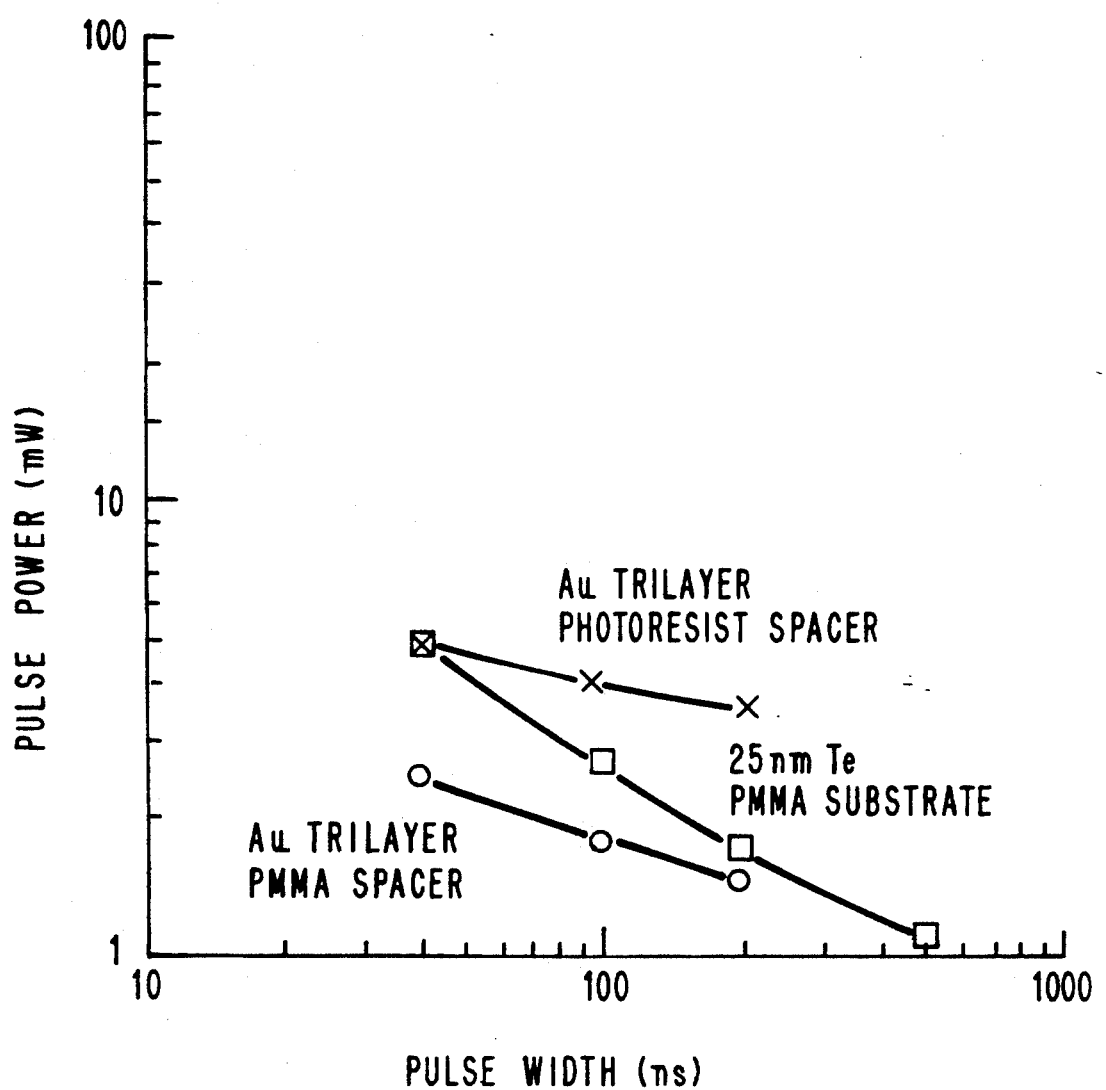
FIG. 11 is a graph of pulse power vs. pulse width for a number of different optical storage structures in accordance with the prior art and in accordance with this invention, respectively.

FIG. 11 shows a comparison of the writing power vs. pulse width curves for gold trilayers using a photoresist spacing layer designated by (x), a PMMA spacing layer designated by (o) and a 25 nm tellurium layer on a PMMA substrate designated by squares (□). In FIG. 11 the 50% writing power vs. pulse duration for gold trilayers (2.5 nm gold) is compared to similar results for a 25.0 nm tellurium film on a PMMA substrate. The discontinuous gold trilayer utilizing a photoresist spacing layer compares well with the results for tellurium only for short pulse durations. However, when PMMA is utilized as the spacing material the writing energy is reduced by a factor of two. This improvement can be attributed to the low thermal conductivity of the PMMA. In this case the discontinuous gold trilayer exhibits lower writing energy than tellurium for pulse durations up to $\sim 300$ nsec. The 50% writing energy is 0.1 nJ for a 40 nsec. pulse duration. Non-optimized, totally encapsulated samples using polymerized photoresist as both the spacing layer and overcoat material have shown 50% writing energies of 0.6 nJ (50 nsec. pulse) using a GaAlAs laser radiating at 830 nm. This value should be significantly improved by utilizing materials such as PMMA for the spacing and overcoat layer.

The low writing energy for this class of materials can be attributed to the writing mechanism which we discussed below. However, regardless of the actual mechanism, it seems clear that a positive driving force to hole formation does exist. When a single discontinuous gold layer (2.5 nm) on a PMMA substrate is compared directly to a continuous (25 nm) tellurium layer (see FIG. 13), the gold exhibits a threshold writing energy (zero optical contrast) that is a factor of two lower even though roughly half as much energy is absorbed by the gold. However, for relative contrast levels of 60%, the gold requires 50% more writing energy. This result lends credibility to the belief that the discontinuous films have a more gradual spot forming process than continuous films.

Figure 12:
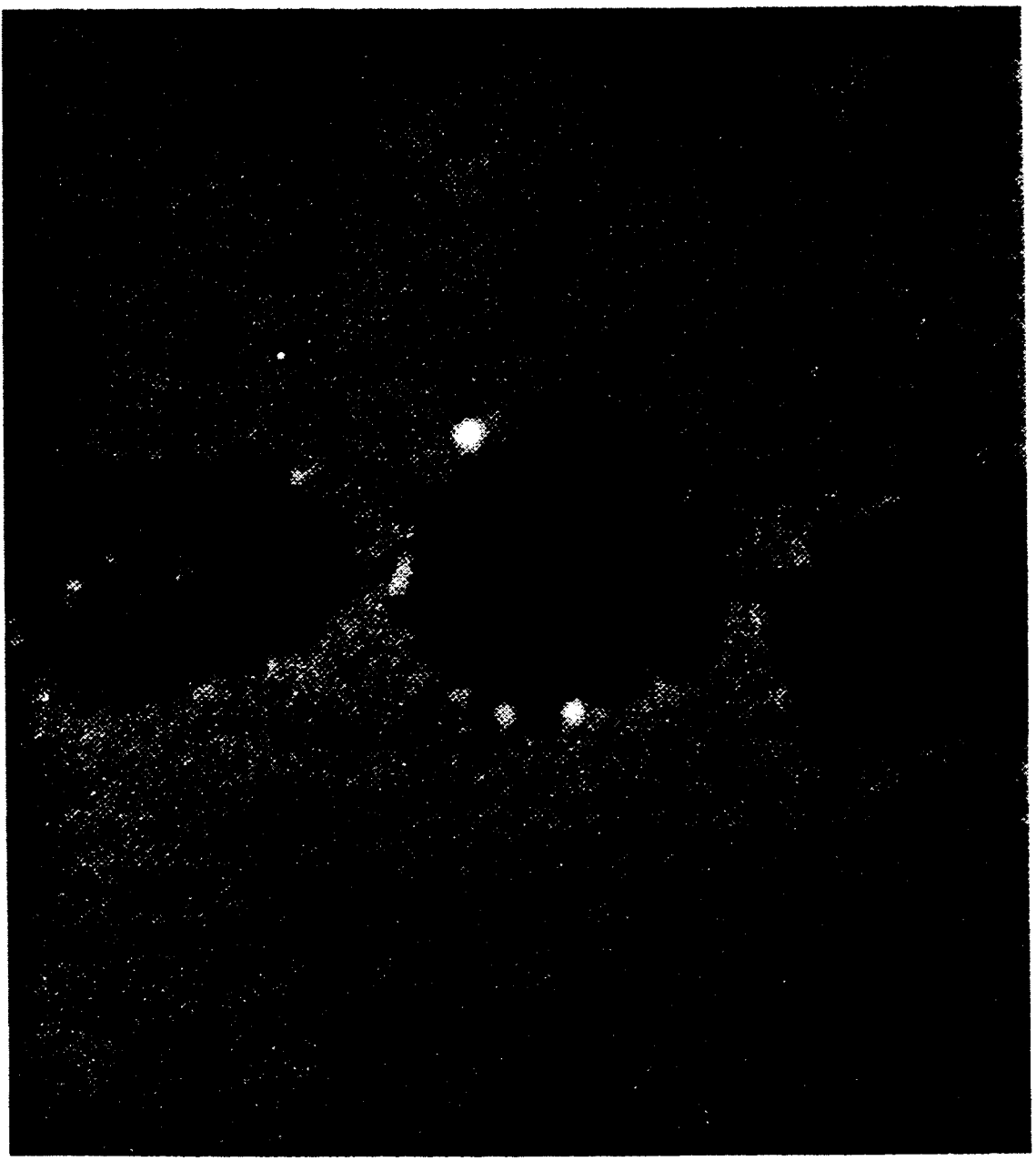
FIG. 12 is a scanning electron micrograph of images of spots written on a discontinuous gold medium made in accordance with this invention.

A scanning electron micrograph (SEM) image of spots written on a gold trilayer using a PMMA spacing layer is shown in FIG. 12. These spots were written with a 0.14 nJ (3.5 mw for 40 nsec., 647.1 nm wavelength) pulse, and exhibit a relative optical contrast change of 70%. The image suggests that gold is still present within the written spots, but this is not clear. At lower writing energies, spots $\leq 0.5$ μm in diameter have been observed.

The second major criterion that a potential optical storage material must satisfy is adequate lifetime. By its nature, this property is more difficult to demonstrate. The fact that a noble metal is utilized as the active layer in these structures lends credibility to the potential lifetime from a corrosion point of view; however, it is not clear that the small particles will be stable. Possible degradation mechanisms include: 1) slow coalescence of the islands even at room temperature, 2) diffusion of the gold and 3) deterioration of the thin polymer layer. Slow changes in optical properties have been observed for discontinuous gold films on PMMA substrates at 75° C., however, thinner samples have demonstrated excellent thermal stability over a thousand hours at 65° C.

We have demonstrated that discontinuous gold films exhibit writing energies that are compatible with GaAlAs lasers. Possible writing mechanisms have been proposed with sintering of the 5.0–10.0 nm islands being preferred at present. The lifetimes of these films are under study, and indications are that stable systems can be developed.

In the course of our investigation of optical storage materials we have found that discontinuous films behave fundamentally differently from continuous films. Metal loaded polymers operate through the use of film and nucleation mechanisms. Such metal "particles" act as local absorbers that heat and ablate a polymer matrix.

In a continuous metal film a spot is written by first bringing the film to its melting point. However, this is inefficient to form a hole in general. This is due to an energy barrier to hole formation which depends on the surface energy of the various materials present, i.e., there is no positive driving force to cause the hole to open at the melting point.

We have found that in discontinuous films this is not the case. Here there is a net driving force that causes the particles to coalesce thus dramatically affecting the optical properties of the layer. In the case of small particles (as formed by thin film nucleation) this coalescence can proceed rapidly even at low temperatures if sufficient energy is provided to cause the individual particles to come into contact. For 50 Å diameter Au particles it has been calculated by Pashley et al Philosophical Mag. 10, 127 (1964) that significant coalescence can occur in less than 1 nsec. (at 400° C.) after the individual particles come into contact. Particles of this size can be fabricated in a single discontinuous layer by using thin film nucleation phenomena. Furthermore, if a layer of these particles is incorporated in a trilayer structure, up to 90% of the incident radiation can be absorbed by the particles. In its undisturbed state the layer is stable since there is insufficient energy for the individual particles to come into contact. However, when the spot is rapidly heated by a laser beam, random motion of the particles increases due to (1) higher temperature, (2) changes in the underlying layer (i.e., melting, glass transition or decomposition) and (3) high radial temperature gradients which act on the particles to push them preferentially from the center of the spot. When the particles collide, coalescence occurs and as this happens the optical properties are changed.

Evidence for this mechanism was found when an SEM of an overburned spot on a Au trilayer (discontinuous film) showed Au balls coalesced within the spot. Spots of this type exhibit contrast changes as high as 15 to 1.

This hole opening mechanism is also suggested by the results shown in FIG. 13. Here we compare the writing characteristics of two films. The first is a 250 Å thick Te layer on a PMMA substrate while the second is a 25 Å thick discontinuous Au layer on a similar PMMA substrate. Due to the optical properties of the two films, only approximately half as much energy is absorbed by the Au layer. We note that the reflectivity change of the Au layer is much more gradual than for the Te. This indicates that as the center of the spot is heated above its threshold, permanent damage is done over a relatively restricted region. However, for the Te case it is more of an all or nothing response. Due to the high thermal conductivity and melting point of Au one would expect a higher threshold energy than for the Te layer, even when the thickness differences are considered. The lower threshold observed can be attributed to (1) a positive driving force for hole formation, (2) reduced lateral thermal conductivity because of the discontinuous nature of the film and (3) the fact that it is not necessary to melt the gold islands to cause them to coalesce.

Dramatic evidence of the importance of film discontinuity to writing energy is shown in FIG. 10. Here 50% writing thresholds for Au trilayer structures are shown as a function of the Au thickness. There is a rapid increase in writing energy for Au films greater than 30 Å (3 nm) thick. Experimental data from TEM studies and electrical conductivity measurements indicate that Au films start to be continuous for thicknesses greater than 30 Å under deposition conditions used. For all the samples shown in FIG. 10 (different Au thickness) the fraction of absorbed light varies relatively little and cannot account for the dramatic change.

Figure 14:
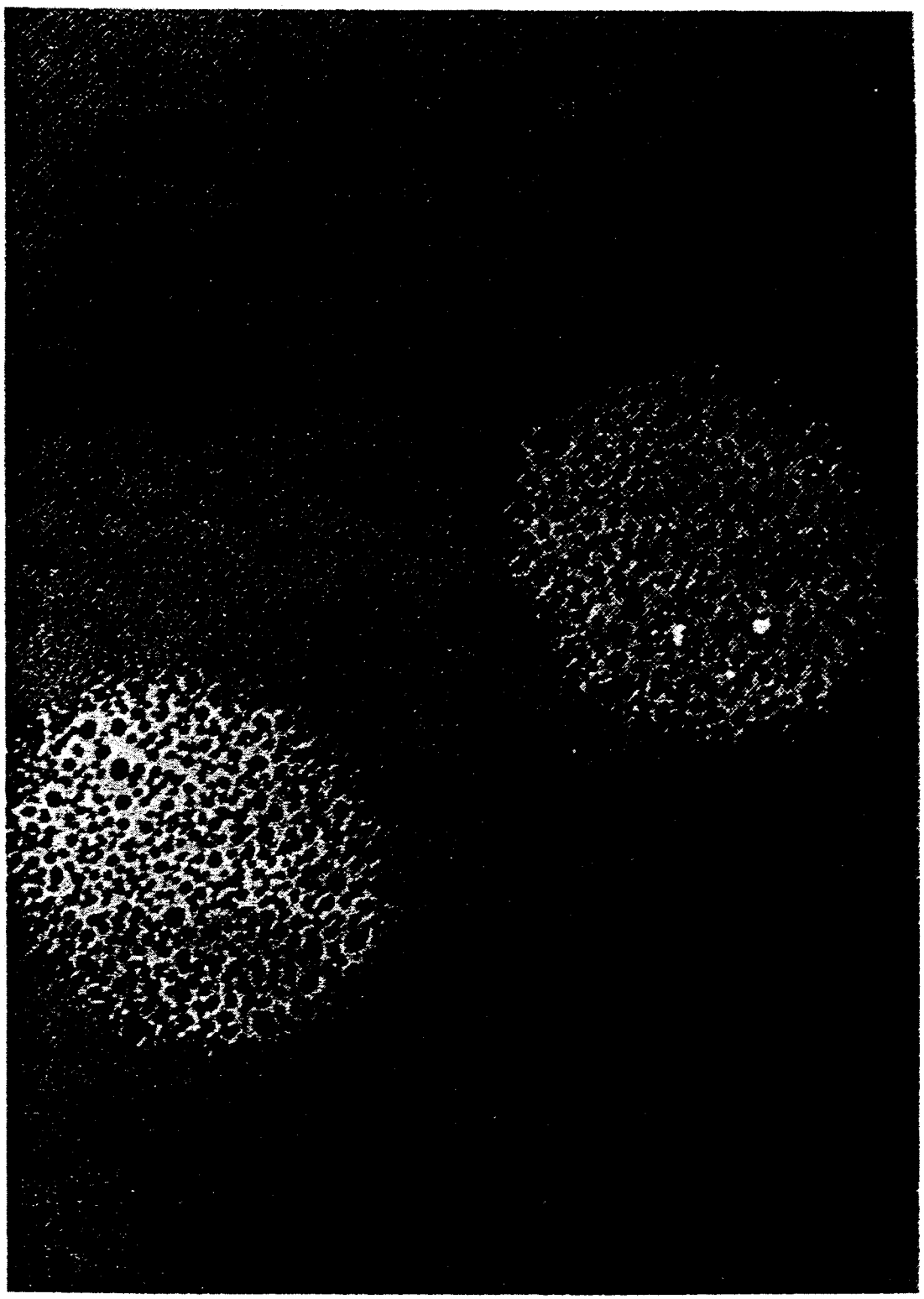
FIG. 14 is a high magnification of a transmission electron micrograph of two spots written on a gold medium.

In FIG. 14 various Au trilayers utilizing different polymers as the spacing layers are compared with a 250 Å Te film on PMMA from a 50% threshold writing point of view. We see than in almost all cases, the Au trilayers are superior. This is particularly true for short pulse durations ($\leq$40 nsec.) and one would expect this improvement to be greater for shorter pulses.

It is surprising that thin films of gold have writing energies comparable to those for tellurium or tellurium based alloys. The low thermal conductivity of tellurium (3.2 w/m°K.) coupled with its low melting point (450° C.) allow it to be ablated with a focussed laser beam of relatively low energy. However, it has been found that due to the nature of the hole opening process it is necessary to heat a local region of the film to temperatures well in excess of its melting point in order to create a hole in the film. This is particularly true if writing times of less than a few hundred nanoseconds are desired. Gold, on the other hand, has a much higher thermal conductivity (312 w/m°K.) and a much higher melting point (1063° C.) than tellurium and thus, if the writing mechanism were similar (i.e., hole burning through film melting and pullback), one would expect a relatively high writing energy. Indeed it has been shown that continuous gold trilayers (as distinguished from the discontinuous films of this invention) require much more writing energy than a 30.0 nm tellurium film.

However, the writing mechanism for discontinuous gold films is quite different than it is for continuous films. In order to better understand the hole forming mechanism for this class of materials, written spots were examined by transmission electron microscopy. Samples were prepared by depositing 2.5 nm of gold at 0.1 nm/sec onto a photoresist layer. Under these conditions the gold film is found to be made up of slightly networked islands that are 5.0 to 10.0 nm in size. Spots were written onto this sample using a krypton layer (0.6

N.A. objective lens at a 647.1 nm wavelength). The gold layer was then transferred t a carbon film and examined by transmission electron microscopy.

In FIG. 13 a high magnification transmission electron micrograph image of two written spots is shown. The hole size of approximately 0.6 micron indicates that these spots were written with about 1 nj of energy, (1 mw, 100 nsec.). The film used was 30Å of Au on a polymer transferred to a carbon film for TEM examination. Within the written region relatively large spherical gold islands are visible while regions outside of the written spot are unchanged. It is interesting that the transition from the written to unwritten region is quite abrupt indicating that a temperature threshold to coalescence exists. This threshold is thought to be due to the necessity of breaking the initial gold islands free from the substrate material before rapid particle coalescence can occur.

It is surprising that the sintering of particles as shown in FIG. 14 can occur as rapidly as required for optical storage applications. Initially the film consists of gold islands on the order of 5.0 to 10.0 nm in size while the written region has particles on the order of 20 to 40 nm in size. In FIGS. 15.1-15.4 the reflected and transmitted optical radiation is shown as a function of time for two write pulse powers. The onset of coalescence is seen to occur in approximately 20 nsec. for the 15 mw pulse employed in FIGS. 15.1 and 15.2. When the pulse power is reduced by a factor of two the onset of coalescence is seen to occur in approximately 50 nsec. In both cases the final reflectivity decreases by a factor of two in the final state, but the change occurs more rapidly at the higher power level.

The coalescence or sintering of small particles has been extensively studied both experimentally and theoretically. Pashley et al supra have shown by studying adjacent frames of ciné film recorded from a transmission electron microscope that relatively large gold islands (200.0 to 1000.0 nm) at 400° C. on a $MoS_2$ substrate can significantly coalesce in less than 60 nsec. Theoretical predictions assuming a surface diffusion driven sintering mechanism indicate that the rate of sintering should be inversely proportional to the particle radius to the fourth power. An approximate relationship for the rate of sintering is given by:

$$x^7/r^3 = A(T)t$$

where x is the radius of the neck that forms between two particles, r is the particle radius, t is the time and A(T) is given by:

$$A(T) = \frac{64 \gamma D_s (\mu)}{kT}$$

where $\gamma$ is the surface energy of the particle, T is the temperature, k is Boltzman's constant, Ds is the surface diffusion coefficient and $\mu$ is the atomic volume. More detailed calculations have been carried out, but the above is an approximation for $x/r < 0.4$.

Using the above relationship and the properties for gold one would predict that 5.0 nm radius particles would coalesce to $x/r=0.1$ in about 10.0 nsec. at a temperature of 400° C. Obviously the particles in FIG. 15 have coalesced to a much greater extent than $x/r=0.1$, however, this is not surprising since the temperatures involved are certainly greater than 400° C. based on thermal modeling considerations. To the first order in temperature, the parameter A(T) is given by:

$$A(T) = \frac{ce^{-Q_s/kT}}{kT}$$

where c is a constant of the material and Qs is the activation energy for surface diffusion. For activation energies from 1-2 ev a 100° C. increase in temperature above 400° C. will result in a 1-2 order of magnitude increase in the sintering rate.

As particles coalesce the average particle size increases and thus one would expect the rate of coalescence to decrease if the temperature remains constant. The reflectivity during writing results shown in FIGS. 16.1-16.4 provide some evidence of this. From these curves it is seen that after coalescence begins there is a rapid drop in optical reflectivity with the first 10.0-20.0 nsec. followed by a much more gradual decrease. However, this response can also be at least partially attributed to the fact that as the reacted spot size increases, it does so in a region where the light intensity is lower and a smaller change in reflectivity is expected.

From the experimental observations presented, the writing process appears to proceed as follows: 1) the incident laser radiation is absorbed by the individual gold islands resulting in a rapid temperature rise of the particles and the underlying substrate, 2) above some threshold temperature the gold particles are freed form the substrate and begin to migrate about the surface, 3) particle which come into contact rapidly sinter into a single larger particle and 4) as sintering continues less energy is absorbed due to the local reduction in optical absorption that occurs within a region of coalescence.

There are several novel features of this writing mechanism when compared with the writing process for continuous metal films. While it is possible that the melting point of gold is reached during the writing time (especially when short writing times are used) it is not a necessary condition. Continuous films, on the other hand, require that the melting point of the metal be reached. In fact, for short writing times, calculations (P. Kuits, J. Vac. Sci. Tech., 18(1) 68 (January/February 1981) indicate that superheating occurs. For discontinuous films the minimum written spot size is controlled by the island size while continuous films exhibit a minimum hole size that is a function of the film thickness, the surface energy of the substrate and the surface energy of the metal. Finally, discontinuous films form written spots as a gradual process that proceeds from the hottest regions while continuous films exhibit a more binary hole opening process.

The potential advantages of using discontinuous metal films (especially small islands) are obvious:

(1) The positive driving force toward particle coalescence results in low writing energies.
(2) Low writing energy can be obtained using even relatively high melting point - high thermal conductivity materials. For instance, the melting point of gold is 600° C. greater than the melting point of Te while its thermal conductivity is two orders of magnitude higher, and yet it can be made to exhibit a low writing energy threshold. This allows one to use stable materials such as the noble metals Rh, Pt, Au or highly stable alloys or any other thin film that exhibits proper film nucleation.

(3) Minimum spot size is controlled by the film island size and for optical recording minimum spot size is not a factor.

(4) Since very little material is moved to write a spot, overcoats will not greatly affect the writing energy. This has been shown using an encapsulated Au trilayer at GaAs wavelengths.

(5) If the writing mechanism is indeed a solid state reaction, the melting point is no longer significant. Writing energy can be optimized by controlling the island size/spacing, the island mass, selecting high surface diffusivity and surface tension materials for the absorber and low melting/decomposition polymers with low surface energy as the spacing layer in a trilayer or as a substrate in a single film.

This application discusses the theoretical and experimental advantages of discontinuous films for optical storage applications. A particular structure (Au trilayers with various polymers as the spacing layer) is shown that exhibits a factor of two (40 nsec. pulse) improvement in the writing energy when compared to a conventional 250Å Te on PMMA structure. A novel mechanism for writing is described which, if correct, will allow this structure to be further optimized using techniques described.

The laser writing characteristics of discontinuous gold films are interesting since; 1) the writing energy is compatible with GaAlAs lasers, 2) the active layer is potentially archival since a noble metal is utilized, and 3) the resolution of the material is well above the resolution achievable with visible light. Writing energies of less than 0.5 nanojoules per spot have been achieved using a GaAlAs laser emitting at 840 nm. In its initial form gold films approximately 2.5 nm thick with individual islands 5.0 to 10.0 nm in size have been utilized. Subsequent work has allowed the use of thicker films with improved optical properties; however, for these films the individual island size is increased to 20.0 to 50.0 nm. Since the written spot is approximately 1000.0 nm in diameter it can be seen that the initial particle size is relatively small and thus should not affect the film resolution.

In conclusion, it has been demonstrated that laser induced coalescence of gold particles can provide sufficient optical contrast for optical storage applications. The initial island size of say 5.0–10.0 nm is increased to 20.0–40.0 nm within the written region. This results in at least a factor of two reductions in optical reflectivity with a commensurate increase in optical transmission. The onset of coalescence was seen to occur in less than 25 nsec. when a 15 mw optical pulse was employed (0.6 N.A. objective and a 647.1 nm wavelength). This time appears to be at least consistent with the theoretical predictions for the sintering of small particles when the particle size and temperature are considered.

While the final cost of an optical disk based on discontinuous films is difficult to predict, the high cost of noble metals is not a major factor. A 12" optical disk would require less than 4.0 mg of gold.

SUPPLEMENTAL DESCRIPTION OF RELATED ART

Kuptsis et al "Calibrated Microsources of Inert Gas" IBM Technical Disclosure Bulletin Vol. 16, No. 4, p. 1219 (September 1973) states "The entrapment of some gas in thin films that are being sputtered in a gas atmosphere is a known phenomenon. For example, some argon is entrapped in a thin film of silicon when the latter is being sputtered. It has been found that the quantity of entrapped gas varies with experimental conditions, but is typically on the order of 1 to 20 wt. percent." The phenomenon of gas entrapment occurs with silicon and "also where there are employed sputtered films, for example, of Al, Ni, Se, Fe, Ne, and Gd-Co. The phenomenon occurs with inert gases other than argon."

Fraser et al "Film Deposition with the Sputter Gun" J. Vac. Sci. Technol. Vol. 14, No. 1 pp 147–151 (January/February 1977) describes sputtering films of a metal such as Au or Cu onto a substrate at pressures of 2.5 mTorr onto glass, ceramic, and cast epoxy substrates. Adherence to cast epoxy was excellent. Film thicknesses were on the order of 600 nm. The sputtering gas was argon. D.C. power was kept at 400 W (1 kV and 400 mA.) during deposition. Deposition rates were 100 nm/min.

Oya et al "Preparation of Ultrafine Particles by Gas Evaporation with Arc Plasma Sputtering" Jpn J. Appl Phys. vol. 21 (March 1982) No. 3, pp. 554–5, describes gas evaporation of iron, silver, chromium, and SiC from a crucible at a rate on the order of 10–50 mg/min, with 15%-Hydrogen gas plus helium gas to about 100 Torr. Ultrafine particles condense and are deposited.

SUPPLEMENTAL SUMMARY OF THE INVENTION

A preferred embodiment of this invention includes use of energy absorbing particles of small size comprising islands which are dispersed between two parallel planes. A thin discontinuous film of particles is disposed between the parallel planes spaced apart by about 20 nanometers and comprises islands of an energy absorbing material.

The present invention resides at least in part in the provision of a thin film of island-particles deposited on a plane above or in contact with the substrate, preferably in contact with a matrix of a matrix material having a low melting point, and low thermal conductivity.

In accordance with this invention an optical storage medium is provided for storing binary data by forming coding spots in the medium with a focussed, high-intensity energy beam. The medium includes a substrate which carries a transparent matrix material having low thermal conductivity and a low melting point.

A discontinuous "thin film" layer of particles of an energy absorbing material lies on the substrate. The particles in the "thin film layer" are located between two parallel planes spaced apart by about 20 nanometers or less. There is a single layer of the particles located between the planes. In other words the particles are not stacked upon one another.

Each of the particles comprises an island of the energy absorbing material, whereby focussed energy can be directed to heat a spot containing a plurality of the particles to cause a change in the reflectivity of the medium to record information at the sites where such heating has occurred.

A "discontinuous thin film layer" is defined herein to be a fragmented film wherein a discontinuous material is deposited in the form of separated islands of the same material which would comprise a continuous layer of the material but for the fragmentation of the incomplete layer of the material.

Further in accordance with this invention, an optical storage medium comprises a substrate with a thin film of a reflective metal thereon. The improvement comprises the thin film being discontinuous, and formed of particles having a size of between about 1 and 10 nanometers in thickness.

The parallel planes are defined by thickness of one particle without any stacking of particles above the lower plane. Thus a single discontinuous "layer" of particles is located between the planes.

Preferably, the particles are embedded at the interface between a matrix of transparent material having a low melting point and the substrate whereby the particles of metal can move within the matrix on the substrate surface in order to coalesce, whereby reflectivity is altered markedly.

Preferably, the particles are embedded at the interface between a plastic material and a matrix of transparent material having a low melting point whereby the particles of metal can move along the interface between the matrix material and the substrate surface in order to coalesce, whereby reflectivity is altered markedly.

In accordance with this invention the matrix material is deposited on the substrate. The medium includes a substrate carrying a matrix material having a low melting point.

An optical storage medium includes discontinuous thin films deposited on a substrate in the form of discontinuous islands of porous gold particles. The particles are located in the space defined by two parallel planes spaced apart by about 20 nanometers or less.

A method of depositing optical storage media in the form of thin films comprises vacuum depositing a deposit on a substrate in the form of discontinuous islands of porous gold particles with hollow spaces within the particles comprising the porosity of the particles.

Preferably, optical storage media in the form of thin films are deposited on a substrate by the method of sputtering the film of gold particles in a plasma of He to form discontinuous islands of gold particles on the substrate.

The sputtering gas is preferably He gas up to 40 micrometers gas pressure.

The sputtering gas is a mixture of He and H.

Application of a high biasing voltage to the substrate of 60 volts or higher is employed.

The source and the target are spaced apart by about three inches.

The deposition time is about 100 to 150 seconds.

An optical storage medium for storing binary data by forming coding spots in the medium with a focussed, high-intensity energy beam, includes a substrate comprising a matrix material having a low melting point and low thermal conductivity. A discontinuous thin film layer of particles of an energy absorbing material lies on the surface of the substrate of matrix material, and the particles in the thin film space located between two parallel planes is spaced apart by less than or equal to about 20 nanometers. The particles between the planes comprise islands of the energy absorbing material, whereby focussed energy can be directed to heat a spot containing a plurality of the particles to cause a change in the reflectivity of the medium to record information at the sites where such heating has occurred.

Optical storage media comprises a plurality of adjacent thin films deposited on a substrate in the form of separated, i.e. discontinuous islands of metallic particles, with the thin films being located within the space defined by two parallel planes spaced apart by about 20 nanometers or less.

A method of depositing optical storage media in the form of thin films by vacuum depositing of material onto a substrate in the form of discontinuous metallic islands of a metal.

Preferably, the metal comprises gold.

Preferably, the optical storage media is in the form of thin films deposited on a substrate by the method of thermal evaporation of a metal.

Preferably the optical storage media is in the form of thin films deposited on a substrate by the method of sputtering in the plasma of argon gas to form discontinuous i.e. separate and distinct islands of metallic particles on the substrate.

Preferably the metal referred to several times above comprises gold.

It is also preferred that the substrate comprises a polymeric material, plastic, or glass (10) having low thermal conductivity, the thin films being coated with a thin film (12) of a plastic material.

Preferably the substrate comprises a layer (10) supporting a mirror layer (15), and a polymeric or plastic layer (14), the thin films of particles (11) being deposited on the polymeric or plastic layer (14).

Alternatively the substrate comprises a layer (10) supporting a minor layer (15), and a polymeric or plastic layer (14), the thin films of particles (11) being deposited on the polymeric or plastic layer (14), and the particles (11) being covered with a thin film of plastic material (12).

The substrate (10) comprises a transparent material, the particles (11) are covered with a thin film of a polymeric material (14) having a low melting point and a low thermal conductivity, and the thin film of polymeric material is coated with a film of a mirror material (15').

In another aspect of this invention the substrate (10) comprises a transparent material, the particles (11) are covered with a thin film of a polymeric material (14) having a low melting point and a low thermal conductivity, and the thin film of polymeric material is coated with a film of a mirror material (15'), and the mirror material (15') is coated with a thin film of a plastic material (12).

SUPPLEMENTAL BRIEF DESCRIPTION OF THE DRAWINGS

Figure 16:
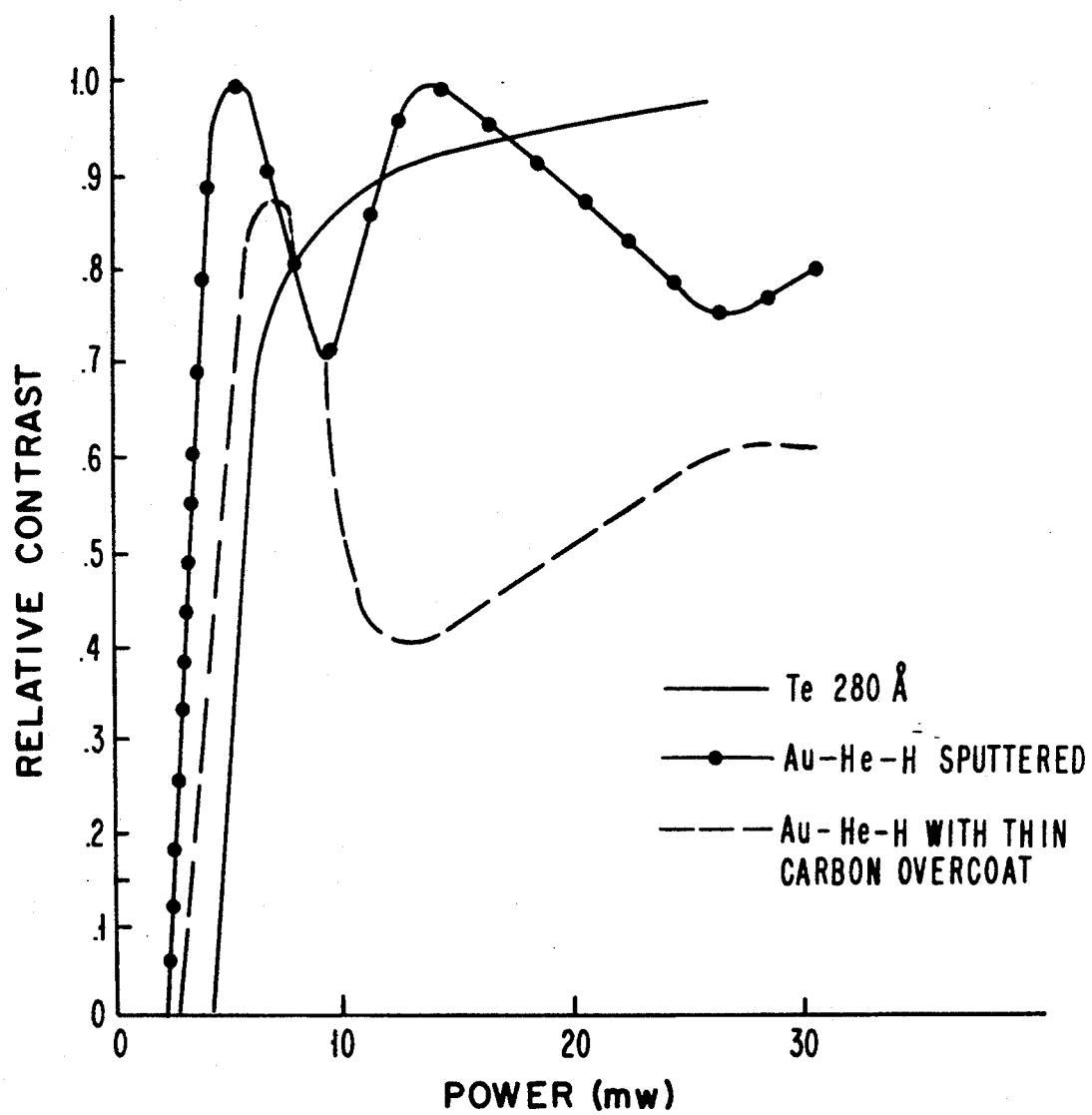

FIG. 16 is a graph of relative contrast versus power for thin films of Au-He-H and Au-He-H with a thin carbon overcoat as contrasted with a thin film of Te.

FIGS. 17.1 and 17.2 show SEM photographs of spots written onto a plasma treated PMMA disk coated with Au particles (partially continuous). FIG. 17.1 is at a 45 degrees viewing angle and FIG. 17.2 is at a viewing angle of 80 degrees.

Figure 18:
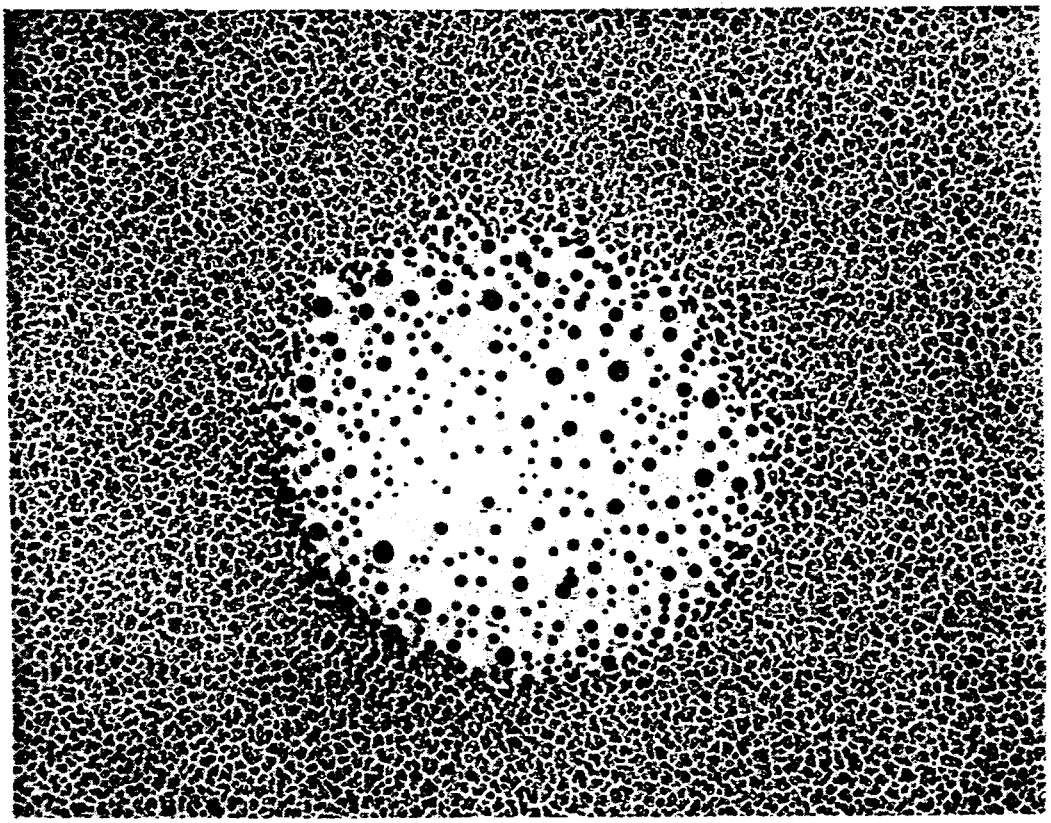

FIG. 18 shows a TEM of a written spot on a PMMA substrate treated in a He plasma. The metallic particles are sputtered Au. The spot diameter is about one micrometer.

FIG. 19.1 is an optical micrograph of spots written onto a treated disk while FIG. 19.2 is a similar micrograph of spots written onto a non-treated disk.

Figure 20:
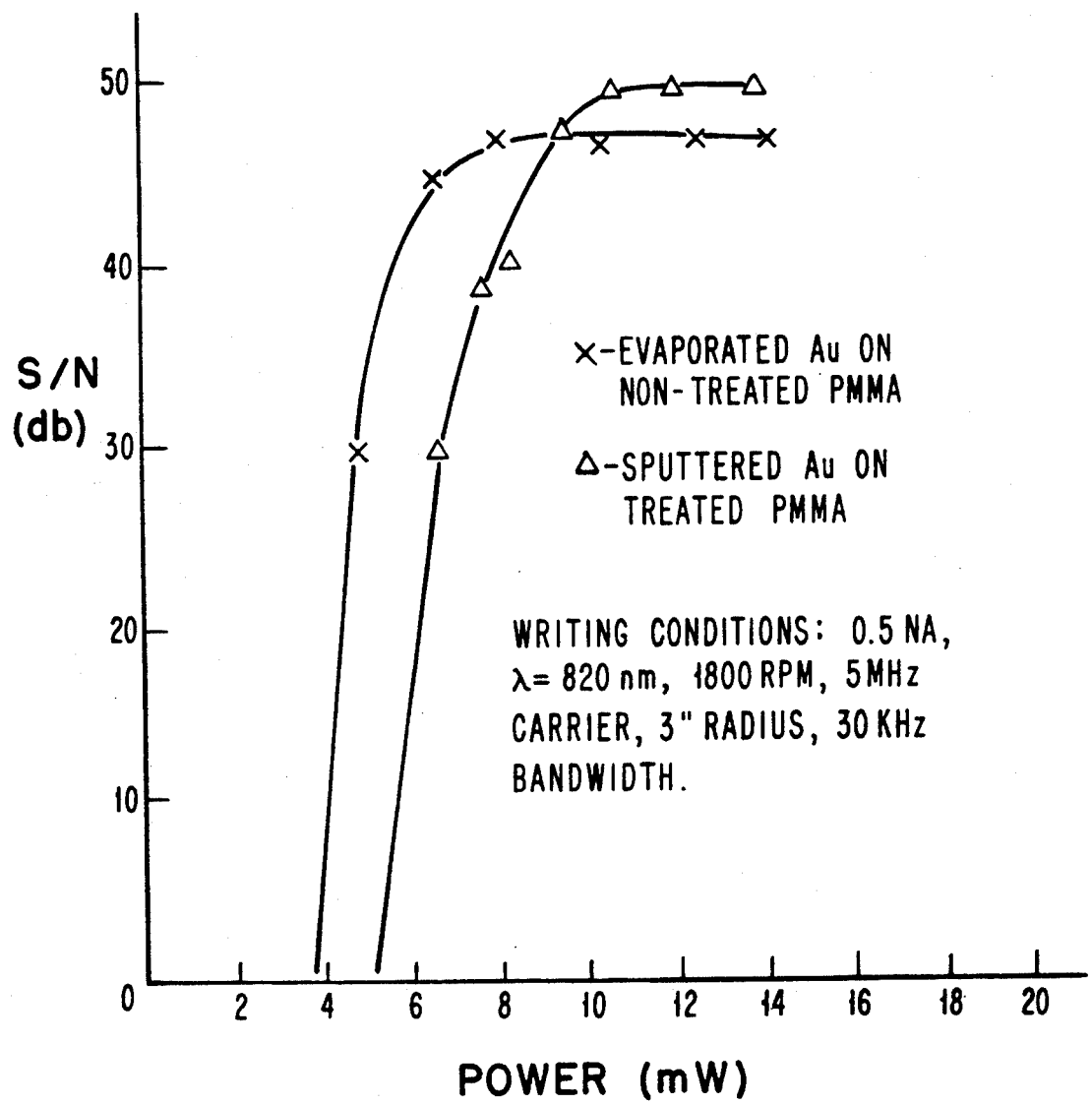

FIG. 20 shows a comparison of the signal-to-noise ratio versus writing energy for a treated and a non-treated PMMA substrate coated with a partially continuous Au film in accordance with this invention.

SUPPLEMENTAL BRIEF DESCRIPTION OF THE PREFERRED EMBODIMENT

In accordance with this invention a discontinuous thin film of particles comprising islands of an energy absorbing material, is carried on the substrate. Here the invention resides in a thin film in the form of a single layer of particles which lie between two closely-spaced parallel planes on the substrate or another layer which is carried on the substrate. The advantage is that the particles which are spaced apart can be placed in sufficient proximity to be substantially opaque while having minimal thickness. The use of gold in such limited quantities has a significant cost advantage. Also, gold is excellent as a material as it is non-degradable in the long term, as it will not be deteriorated by oxidation. When the gold particles are heated, they will coalesce so that light can pass through the thin film of coalesced particles which cover less surface area on the substrate.

This invention comprises ultrathin layers (less than or equal to 20 nm) of metallic islands particles in a thin discontinuous film of particles between parallel planes.

The thin films of this invention overcome the problems of a dispersion of particles rather than a thin film (of the kind claimed herein). Our metallic particles are not stacked one above the other, so that a small amount of metal will be left behind when the particles coalesce and the coalesced particles will be so small that they will reflect little light.

This invention requires little energy from the laser recording or other recording device to heat the medium to form marks due to the small volume of metallic material which must be heated in the single layer between the two parallel planes of discontinuous particles of the absorbing material, which are isolated from one another. The writing properties are not critically dependent on the characteristics of the matrix material as well as the absorbing particles, in terms of viscous flow, heat capacity, thermal conductivity and glass transition temperature of the polymer (temperature of softening of the polymer).

Our small particle size is satisfactory for the purpose of achieving high density data storage in accordance with this invention where the particles are in the range from about 1 to 100 nm in size as contrasted to particles with a 500 nm average size, the spot size for data recording obviously cannot be smaller than the average particle size. In fact, due to readback considerations, it is necessary that each spot written (approximately 1,000 nanometers in size) contain several particles in order to achieve a desirable recorded signal-to-noise ratio. With particles having an average size of 500 nanometers, the medium would include from about three to five particles in a 1,000 nanometer size spot. The medium would not be useful as a product with such a small number of particles per spot.

MATRIX MATERIAL

A matrix of a transparent, low conductivity material is appropriate as the matrix material herein. Preferably the material comprises an organic polymer. The values of thermal conductivity are those of typical polymers so that the local heating will melt the matrix locally enhancing the tendency of the particles to coalesce only locally. The matrix material also has a low melting point.

Au-He-H Films for Archival Optical Storage

Hollow Gold Particles

1) Optical storage media in the form of thin films deposited on a substrate in the form of discontinuous islands of hollow gold particles. Preferably the particles are on the order of 10 to 50 nm in size.

Optical storage media in the form of thin films are deposited on a substrate by the method of sputtering the film of gold particles in a plasma to form discontinuous islands of gold particles on the substrate. Key features of this aspect of the invention are:
1) the choice of the sputtering gas which is preferably He gas up to 40 micrometers gas pressure (alternatively the sputtering gas is a mixture of He and H);
2) application of a high biasing voltage to the substrate of 60 volts or higher;
3) preferably, the source and the target are spaced apart by about three inches;
4) the deposition time is about 100 to 150 seconds.

The upper limit on the thickness of the particles is about 10 nanometers, and the fact that that is an average thickness means that the range of thickness goes up to about 20 nm at the outer limit of the range.

Gold films are well known for corrosion resistance and are suitable as an archival recording medium if the writing power can be reduced. One way to achieve this is to make gold films thin enough so that the films consist of gold islands in which the thermal conduction in the lateral direction is virtually eliminated because of the discontinuity between adjacent islands.

THERMAL EVAPORATION

Discontinuous metal layers of gold can be formed through thermal evaporation techniques. Deposition rates of 0.05 to 1.0 Å/sec yield suitable results when deposited at pressure of $\leq$ 1e-6 torr. If high optical absorption and reflectivity are desired without using an additional reflective layer (FIGS. 1 and 2), this can be accomplished by depositing a thicker (but still discontinuous) layer onto a rotating substrate that is tilted at an angle of from 45-85 degrees with respect to the source. In this manner discontinuous films with reflectivities up to 20% and absorptions up to 60% can be readily formed.

SPUTTERING TECHNIQUES

In NMR Studies of H and He Contained in Gold Films, J.A.P. 42, 2356-2361, (1971) H. T. Weaver, He and H gases were found to be incorporated in gold films. Hydrogen was found to be in packets of gas (or bubbles) and helium was found to be dispersed uniformly within the gold film occupying some of gold atomic sites.

In this application, we present island-structured Au-H-He particles, with typical thicknesses less than 10 nanometers. Two important parameters of fabricating such films are (1) a high bias voltage applied to the substrate typically 60 volts and higher, and (2) bombardment of a growing film with energetic particles of H and He. The latter can best be done by using a sputter-gun or a magnetron source with a close spacing between the source and target, typically less than 3 inches.

The best deposition conditions found so far are the following:

Gas Composition and Pressure: Introduce He gas to 40 microns and ignite plasma with bias power applied to substrate holder up to 300 watts. At this power level, the substrate holder develops a bias voltage of approximately −90 volts. At the same time, the total pressure rises 45 to 48 microns due to outgassing of H and O from the walls of chamber, the substrates and the substrate holder. Thus, H and O accounts for 10 to 20% of the total pressure.

Gold Source and Power Levels: An r-f powered sputter-gun with a typical power of 500 watts. This generates approximately 360 to 400 volts at the target.

Target-to-substrate Spacing: The optimum value is around 3 inches.

Deposition Rate: Athough the precise thickness of the gold-H-He islands is difficult to measure by conventional means, a deposition time of 100 to 150 seconds produces the largest aspect ratio (height of islands to island size). Beyond 150 seconds, islands begin to coalesce. An ideal monitor is a conductance meter.

Alternate Source of Deposition: A production type magnetron source is perfectly suited for production of a large quantity of disks because of the close distance required between the source and the substrate. This is especially suitable for high-pressure sputtering as demonstrated here.

Alternate Gas for Sputtering: In a production environment, a mixed gas of He and H would be more useful than deriving the hydrogen from the outgassing as described above.

In FIG. 16 the contrast vs. writing power for these films is compared to Te. It is seen that the writing energy is lower than that for the more conventional tellurium (Te). The writing energy remains lower even when a thin carbon overcoat is added. This low writing energy coupled with the stability and lack of toxicity of these films make them attractive. Furthermore, because of the more spherical nature of the particles found in the plasma process described herein (as seen in TEM microphotographs), we obtain an improved single-to-noise ratio as compared with previous solid particle materials.

Discontinuous gold films with a thin skin over the isolated gold islands are excellent for optical recording media.

In this invention we show a practical method of producing such films on a large scale (high throughput). Films of gold are deposited onto optical-grade disks using high-rate sputtering source such as a magnetron source with a close spacing between the substrate and target. The sputtering gas is a mixture of He and PMMA monomer where the monomer concentration may vary from 20 to 80% with the balance being He.

During the deposition, a substrate bias in the range of 100 to 300 volts is applied by applying an RF power to the disk holder via a suitable match box located between the source and Rf generator.

Resulting films should consist of gold islands with "swiss cheese" (hollow spaces defined therein) like appearance and a thin PMMA skin over the islands. The thickness of this skin is controlled to an optimum value by adjusting the gas composition and the RF power applied to the source during the latter part of deposition.

Preliminary results of gold films prepared in pure He gas on PMMA disks show outstanding adhesion as compared with similar films prepared by sputter-gun. This strong adhesion, coupled with good optical properties, and the micro-skin should provide a long-life high-sensitivity recording medium.

Au-He-H Films for Archival Optical Storage

The optical storage media is preferably in the form of thin films deposited on a substrate in the form of discontinuous islands of porous gold particles with hollow spaces therein. Preferably the particles are on the order of 10 to 50 nm in size laterally, between a pair of parallel planes spaced apart by about 20 nm or less.

Optical storage media in the form of thin films are deposited on a substrate by the method of sputtering the film of gold particles in a plasma to form discontinuous islands of porous gold particles on the substrate. Key features of the invention are:

1) the choice of the sputtering gas which is preferably He gas up to 40 micrometers gas pressure (alternatively the sputtering gas is a mixture of He and H);
2) application of high biasing voltage to the substrate of 60 volts or higher;
3) preferably, the source and the target are spaced apart by about three inches;
4) the deposition time is about 100 to 150 seconds.

We have found that treating a PMMA disk in a He Plasma introduces a thin rigid "skin" on the surface of the PMMA. This skin is most probably due to the plasma polymerization of the PMMA. This skin acts to dramatically improve the hole forming properties of discontinuous or networked metal films when laser beam written. This occurs by delamination of the thin skin in a uniform manner from the PMMA surface to form a blister onto which the metal film coalesces to form uniform optical contrast. This improves the spot formation on discontinuous and networked films, as well as continuous films that normally do not exhibit high signal-to-noise ratios of optical contrast.

Evidence of the skin formation is shown in FIGS. 17.1 and 17.2. FIG. 17.1 shows an SEM of a written spot on a He sputtered Au film at a 45° viewing angle while FIG. 17.2 is at an 80° viewing angle. FIG. 17.2 clearly shows the blister formation due to the thin "skin" while FIG. 17.1 shows that the written spot is quite uniform.

FIG. 18 shows a TEM of a similar spot. The blister is not evident from this single image, but can be seen in a stereo pair. The particles are seen to have coalesced on the blister surface.

The desired surface skin is formed by plasma treating the PMMA surface in a He atmosphere either prior to or during the gold deposition.

Typical sputtering conditions are 1) 500~700 W rf power, 2) 100 W rf bias −80 V to −100 V to substrate 3) pressure of 60 microns He with residual $H_2O$ and $H_2$, 4) substrate-to-target distances of 2-5" and 5) exposure times of 0.1 to 2 minutes. When only the skin is desired, a low yield sputter target is used, while for He sputtered Au the skin forms during deposition. While use of a He plasma has been employed, other chemically inert gases such as Ne, Ar, Kr and Xe would have similar effects. Reactive gases may also be useful, but they should not etch the surface.

In FIGS. 19.1 and 19.2, we compare optical micrographs of written spots on partially continuous Au films for both treated and non-treated PMMA disks. It is clear that the holes are more uniform when the surface has been treated. The writing energy of the treated surface is slightly higher than for the non-treated case as shown in FIG. 21, but it is definitely compatible with GaAs lasers.

ARGON SPUTTERING

In addition to sputtering in an He environment, it has also been found that sputtering in an argon environment can be employed to form the discontinuous island film. To date the best conditions for Argon sputtered gold films are found to consist of about 2 micro argon pressure, about 0.1 Å/sec deposition rate 25-50 watt input power with a reverse rf bias applied to the substrate of 50-100 watts rf (about 60 V). This process also leads to micro-skin formation at the PMMA surface with an improvement in the quality of written spots.

In conclusion, we have demonstrated that plasma treatment of a PMMA disk can markedly improve the hole opening properties of discontinuous and partially continuous gold films. This allows one ultimately to use thicker Au films with improved optical contrast while maintaining low writing energy (~0.4 n J/spot) and good S/N (~50 dB with a 30 KHz bandwidth limited by substrate, not hole noise). We have described two plasma processes for forming the desired surface skin, but it is quite likely that other techniques such as 1) direct deposition, 2) ion beam treatment or 3) UV exposure may yield similar results.

Having thus described our invention, what we claim as new, and desire to secure by Letters Patent is:

1. An optical storage medium for storing binary data by printing coding spots in a uniform medium adapted to be written upon by a focussed high intensity energy beam, said medium consisting essentially of
   a substrate transparent to said energy beam, having low thermal conductivity and a low melting point
   said substrate having a surface carrying a discontinuous thin layer of particles,
   said discontinuous thin layer of particles being substantially of a single thickness and form separate islands of an energy absorbing material of a metal selected from the group consisting of Au, Ag, Cu, Pt, Pd, and Rh,
   whereby said separate islands of particles are juxtaposed with each other with small spacings therebetween,
   such that focussed energy can be directed to heat a spot containing a plurality of said particles to cause a change in the reflectivity of said medium to record information at the sites where heating has occurred.

2. A medium in accordance with claim 1 wherein said thin layer of particles is composed of particles ranging in thickness from about 1 to 10 nanometers.

3. A medium in accordance with claim 1 wherein said particles range from about 2.5 to 1,000 nanometers in width.

4. A medium in accordance with claims 1, or 3 wherein
   a radiation reflecting layer is incorporated into said medium such that said reflective layer and said thin layer of particles are separated by an intermediate layer transparent to said energy beam having a thickness equal to about ¼ wavelength of the radiation to be applied to said medium.

5. A medium in accordance with claim 1 wherein said medium is applied with a density of less than 4 mg of gold is for an area equivalent to a twelve inch diameter optical disk.

6. A medium in accordance with claim 1 wherein said energy absorbing medium is transformed by laser writing to form marks characterized by particle sizes of about 20 to 40 nanometers in size.

7. A medium in accordance with claim 1 wherein said particles are prepared by means of vacuum deposition by a method including thermal evaporation, sputtering and ion-beam deposition.

8. A medium in accordance with claim wherein said substrate comprises a material selected from polymethyl methacrylate (PMMA), glass, polycarbonate.

9. An optical storage medium consisting essentially of
   a substrate having a surface, carrying
   a discontinuous thin layer consisting essentially of particles of a noble metal on said surface,
   said discontinuous thin layer of particles being formed without stacking of said particles on top of each other above said substrate,
   said discontinuous, thin layer being coated with a layer of a plastic material which is optically clear and non-birefrigent.

10. An optical storage medium in accordance with claim 9, wherein:
    said plastic material has a low melting point, and
    said particles on said surface of said substrate are embedded at the interface between said plastic material and said substrate,
    whereby said particles of metal can move through said plastic material along the surface of said substrate in order to coalesce said particles together, whereby reflectivity is altered markedly.

11. An optical storage medium in accordance with claim 9, wherein
    said particles are embedded at the interface between said plastic material and said substrate; said plastic material having a low melting point, and said substrate being transparent;
    whereby said particles of metal can move within said plastic material along said surface in order to coalesce said particles together,
    whereby reflectivity is altered markedly.

12. Optical storage media in the form of a plurality of adjacent thin films deposited on a substrate in the form of discontinuous islands of noble metallic particles, said thin films being located within the space defined by two parallel planes spaced apart by about 20 nanometers or less wherein said substrate comprises a polymeric material, plastic, or glass having low thermal conductivity, said thin films being coated with a thin film of a plastic material.

13. Optical storage media in the form of a plurality of adjacent thin films deposited on a substrate in the form of discontinuous islands of noble metallic particles, said thin films being located within the space defined by two parallel planes spaced apart by about 20 nanometers or less wherein said substrate comprises a layer supporting a mirror layer, and a polymeric or plastic layer,
    said thin films of particles being deposited on said polymeric or plastic layer.

14. Optical storage media in the form of a plurality of adjacent thin films deposited on a substrate in the form of discontinuous islands of noble metallic particles, said thin films being located within the space defined by two parallel planes spaced apart by about 20 nanometers or less wherein said substrate comprises a transparent material, said particles are covered with a thin film of a polymeric material having a low melting point and a low thermal conductivity, and said thin film of polymeric material being coated with a film of a mirror material.

15. An optical storage medium for storing binary data by printing coding spots in a uniform medium adapted to be written upon by a focussed high intensity energy beam, said medium consisting essentially of a substrate transparent to said energy beam having low thermal conductivity and a low melting point, said substrate having a surface carrying a discontinuous thin layer of particles of a noble metal;

said discontinuous thin layer of particles of a noble metal being substantially of a single thickness and forming separate islands of an energy absorbing material, whereby said separate islands of particles are juxtaposed with each other with small spacings therebetween, such that focussed energy can be directed to heat a spot containing a plurality of said particles to cause a change in the reflectivity of said medium to record information at the sites where heating has occurred.

16. An optical storage medium for storing binary data by printing coding spots in a uniform medium adapted to be written upon by a focussed high intensity energy beam, said medium consisting essentially of a substrate transparent to said energy beam having low thermal conductivity and a low melting point;

said substrate having a surface carrying a discontinuous thin layer of particles of highly stable alloys, said discontinuous thin layer of particles of highly stable alloys being substantially of a single thickness; and forming separate islands of an energy absorbing material, whereby said separate islands of particles are juxtaposed with each other with small spacing therebetween, such that focussed energy can be directed to heat a spot containing a plurality of said particles to cause a change in the reflectivity of said medium to record information at the sites where heating has occurred.

17. An optical storage medium for storing binary data by printing coding spots in a uniform medium adapted to be written upon by a focussed high intensity energy beam, said medium consisting essentially of:

a substrate transparent to said energy beam having low thermal conductivity and a low melting point;

said substrate having a surface carrying a discontinuous thin layer of particles of a metal exhibiting film nucleation upon heating;

said discontinuous thin layer of particles being substantially of a single thickness, and disposed so as to form separate islands which are juxtaposed with each other with small spacing therebetween so, that focussed energy can be directed to heat a spot containing a plurality of said particles to cause a change in the reflectivity of said medium to record information at the sites where heating has occurred.

* * * * *